(12) United States Patent
Tourapis et al.

(10) Patent No.: US 9,667,964 B2
(45) Date of Patent: May 30, 2017

(54) REDUCED COMPLEXITY MOTION COMPENSATED TEMPORAL PROCESSING

(71) Applicant: Dolby Laboratories Licensing Corporation, San Francisco, CA (US)

(72) Inventors: Alexandros Tourapis, Milpitas, CA (US); Athanasios Leontaris, Mountain View, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 119 days.

(21) Appl. No.: 14/342,523

(22) PCT Filed: Sep. 27, 2012

(86) PCT No.: PCT/US2012/057654
§ 371 (c)(1),
(2) Date: Mar. 3, 2014

(87) PCT Pub. No.: WO2013/049412
PCT Pub. Date: Apr. 4, 2013

(65) Prior Publication Data
US 2014/0247888 A1 Sep. 4, 2014

Related U.S. Application Data

(60) Provisional application No. 61/541,028, filed on Sep. 29, 2011.

(51) Int. Cl.
*H04N 19/139* (2014.01)
*H04N 19/51* (2014.01)
(Continued)

(52) U.S. Cl.
CPC ....... *H04N 19/0089* (2013.01); *H04N 19/132* (2014.11); *H04N 19/137* (2014.11);
(Continued)

(58) Field of Classification Search
CPC ............. H04N 19/0089; H04N 19/132; H04N 19/137; H04N 19/172; H04N 19/192;
(Continued)

(56) References Cited

U.S. PATENT DOCUMENTS

| 4,689,672 A * | 8/1987 | Furukawa | ............ H04N 19/503 |
| | | | 375/240.12 |
| 5,008,746 A | 4/1991 | Bernard | |

(Continued)

FOREIGN PATENT DOCUMENTS

| EP | 1133191 | 9/2001 |
| WO | 01/61993 | 8/2001 |

(Continued)

OTHER PUBLICATIONS

Cheong, H.Y. et al "Advanced Spatio-Temporal Filtering for Video De-Noising", in Proc. IEEE Int. Conf. on Image Processing, vol. 2, pp. 965-968, Oct. 2004.

(Continued)

*Primary Examiner* — Behrooz Senfi

(57) ABSTRACT

A method and system for reduced complexity motion compensated temporal processing for pre-analysis purposes. The processing complexity is reduced by reducing the number of pictures processed for analysis, reducing the number of references used for analysis, and/or spatially subsampling input pictures.

25 Claims, 14 Drawing Sheets

(51) Int. Cl.
*H04N 19/80* (2014.01)
*H04N 19/159* (2014.01)
*H04N 19/172* (2014.01)
*H04N 19/61* (2014.01)
*H04N 19/132* (2014.01)
*H04N 19/137* (2014.01)
*H04N 19/192* (2014.01)
*H04N 19/436* (2014.01)
*H04N 19/53* (2014.01)
*H04N 19/557* (2014.01)
*H04N 19/587* (2014.01)
*H04N 19/86* (2014.01)
*H04N 19/87* (2014.01)

(52) U.S. Cl.
CPC ......... *H04N 19/139* (2014.11); *H04N 19/159* (2014.11); *H04N 19/172* (2014.11); *H04N 19/192* (2014.11); *H04N 19/436* (2014.11); *H04N 19/51* (2014.11); *H04N 19/53* (2014.11); *H04N 19/557* (2014.11); *H04N 19/587* (2014.11); *H04N 19/61* (2014.11); *H04N 19/80* (2014.11); *H04N 19/86* (2014.11); *H04N 19/87* (2014.11)

(58) Field of Classification Search
CPC .... H04N 19/436; H04N 19/52; H04N 19/557; H04N 19/587; H04N 19/61; H04N 19/80; H04N 19/86; H04N 19/87; H04N 19/139; H04N 19/159; H04N 19/51; H04N 19/593; H04N 19/70; H04N 19/44; G06T 2200/00; G06T 1/00
USPC .................................................. 375/240.26
See application file for complete search history.

(56) References Cited

U.S. PATENT DOCUMENTS

| | | | |
|---|---|---|---|
| 5,247,355 A * | 9/1993 | Frederiksen | H04N 5/144 348/E5.065 |
| 5,621,468 A | 4/1997 | Kim | |
| 6,061,100 A | 5/2000 | Ward | |
| 6,898,324 B2 | 5/2005 | Pesquet-Popescu | |
| 7,068,722 B2 | 6/2006 | Wells | |
| 7,110,455 B2 | 9/2006 | Wu | |
| 7,512,182 B2 | 3/2009 | Chen | |
| 7,558,320 B2 | 7/2009 | Winder | |
| 7,724,307 B2 | 5/2010 | Wan | |
| 2004/0028143 A1* | 2/2004 | Schoenblum | H04N 19/147 375/240.25 |
| 2005/0031037 A1* | 2/2005 | Carrasco | H04N 19/619 375/240.16 |
| 2005/0207494 A1 | 9/2005 | Ahn | |
| 2005/0220190 A1 | 10/2005 | Ha | |
| 2005/0226317 A1 | 10/2005 | Bottreau | |
| 2005/0226335 A1 | 10/2005 | Lee | |
| 2005/0232499 A1 | 10/2005 | Ha | |
| 2006/0008003 A1 | 1/2006 | Ji | |
| 2006/0008038 A1* | 1/2006 | Song | H04N 19/63 375/350 |
| 2006/0013493 A1* | 1/2006 | Yang | H03M 7/4006 382/232 |
| 2006/0072661 A1 | 4/2006 | Kim | |
| 2006/0083300 A1 | 4/2006 | Han | |
| 2006/0093041 A1 | 5/2006 | Cieplinski | |
| 2006/0221418 A1 | 10/2006 | Lee | |
| 2006/0222079 A1 | 10/2006 | Park | |
| 2006/0250520 A1 | 11/2006 | Han | |
| 2006/0280372 A1 | 12/2006 | Han | |
| 2007/0014368 A1 | 1/2007 | MacInnis | |
| 2007/0086520 A1 | 4/2007 | Kim | |
| 2007/0133680 A1 | 6/2007 | Kimoto | |
| 2007/0171971 A1 | 7/2007 | Francois | |
| 2007/0201557 A1 | 8/2007 | Francois | |
| 2007/0217513 A1 | 9/2007 | Lopez | |
| 2008/0025394 A1 | 1/2008 | Francois | |
| 2008/0037633 A1 | 2/2008 | Pateux | |
| 2009/0244365 A1 | 10/2009 | Takeda | |
| 2010/0215103 A1 | 8/2010 | Yin | |
| 2010/0303384 A1 | 12/2010 | Knee | |
| 2010/0309979 A1 | 12/2010 | Schoenblum | |
| 2010/0316127 A1* | 12/2010 | Yokoyama | G06T 7/2026 375/240.16 |

FOREIGN PATENT DOCUMENTS

| | | |
|---|---|---|
| WO | 2005/022923 | 3/2005 |
| WO | 2005/078663 | 8/2005 |

OTHER PUBLICATIONS

Andreopoulos, Y. et al "In-Band Motion Compensated Temporal Filtering" Signal Processing: Image Communication, vol. 19, pp. 653-673, published in May 2004.

Turaga, D.S. et al "Unconstrained Motion Compensated Temporal Filtering (UMCTF) for Efficient and Flexible Interframe Wavelet Video Coding" vol. 20, Issue 1, pp. 1-19, Jan. 2005.

Dubois, E. et al "Noise Reduction in Image Sequences Using Motion-Compensated Temporal Filtering", IEEE Transactions on Communications, vol. COM-32, No. 7, pp. 826-831, Jul. 1984.

Brailean, J.C. et al "Noise Reduction Filters for Dynamic Image Sequences: A Review", Proceedings of the IEEE, vol. 38, pp. 1272-1292, Sep. 1995.

Llach, J. et al "H.264 Encoder with Low Complexity Noise Pre-Filtering", Proc. SPIE, Applications of Digital Image Processing XXVI, vol. 5203, pp. 478-489, Aug. 2003.

Candes, E.J. "Compressive Sampling", Proceedings of the International Congress of Mathematicians, Madrid, Spain, 2006.

Hiki, M. et al "Motion-Compensated Spatio-Temporal Nonseparable Filtering for Scalable Video Coding" Journal of the Institute of Image Information and Television Engineers, v 63, No. 11, pp. 1604-1610, Nov. 2009.

Hiki, M. et al "Suppression of PSNR Fluctuation in Motion-Compensated Temporal 1/3-Transform Through Non-Separable Sub-Sampling" Proceedings International Conference on Image Processing, ICIP, p. 2153-2156, Oct. 2006.

Zhai, J. et al "A Low Complexity Motion Compensated Frame Interpolation Method" Proc. IEEE International Symposium on Circuits and Systems, pp. 4927-4930, May 2005.

Atta, R. et al "Spatio-Temporal Scalability Based on Motion-Compensated DCT Temporal Filters" Proc. International Conference on Image Processing, pp. 641-644, Nov. 2009.

Li, X. et al "Motion Compensated Prediction for Scalable Video Coding in the Wavelet Domain" Journal of Information and Computational Science, v 2, No. 3, pp. 507-516, Sep. 2005.

Ruiqin, X. et al "In-Scale Motion Compensation for Spatially Scalable Video Coding" Circuits and Systems for Video Technology, Feb. 2008.

Tagliasacchi, M. et al "Motion Estimation and Signaling Techniques for 2D+t Scalable Video Coding" Journal EURASIP Journal on Applied Signal Processing, vol. 2006, Jan. 2006.

Llach, Joan et al. "H.264 Encoder with Low Complexity Noise Pre-Filtering" Proc. of SPIE, International Society for Optical Engineering, vol. 5203, Jan. 1, 2003, pp. 478-489.

Tsung Han Tsai et al. "The Hybrid Video Error Concealment Algorithm with Low Complexity Approach" Information, Communications and Signal Processing, 2003 and Fourth Pacific Rim Conference onMultimedia, Dec. 15-18, 2003, vol. 1, pp. 268-271.

Huang, Yu-Wen et al. "Analysis and Reduction of Reference Frames for Motion Estimation in MPEG-4 AVC/JVT/H.264" IEEE 2003.

International Search Report for International Application No. PCT/US2012/057654 filed Sep. 27, 2012 on behalf of Dolby Laboratories Licensing Corporation. Mail Date: Mar. 28, 2013. 6 pages.

(56) References Cited

OTHER PUBLICATIONS

Written Opinion for International Application No. PCT/US2012/057654 filed Sep. 27, 2012 on behalf of Dolby Laboratories Licensing Corporation. Mail Date: Mar. 28, 2013. 13 pages.

* cited by examiner

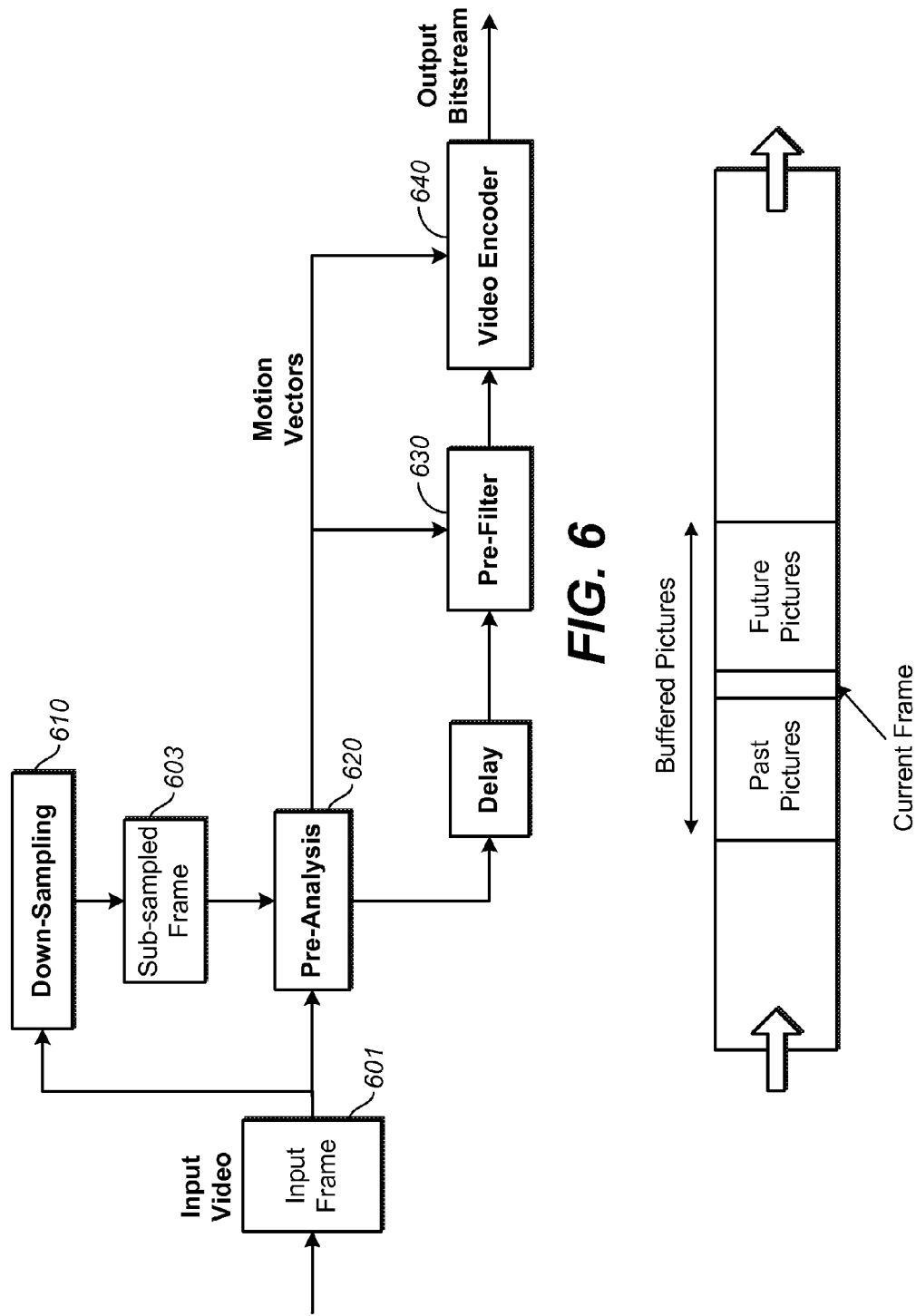

REDUCED COMPLEXITY MOTION COMPENSATED TEMPORAL PROCESSING

CROSS-REFERENCE TO RELATED APPLICATIONS

This application claims priority to U.S. Provisional Patent Application No. 61/541,028 filed 29 Sep. 2011, hereby incorporated by reference in its entirety.

FIELD OF THE INVENTION

The present application is related to the field of video data processing. More particularly, the present application describes processing to produce motion-compensated predictions of a current picture using as references previous past or future pictures.

BACKGROUND OF THE INVENTION

Motion-compensated temporal analysis (MCTA) is a useful tool for a variety of applications that include optimization of compression performance/efficiency, filtering, and video content analysis and classification. The premise behind MCTA is the exploitation of the temporal correlation that characterizes video signals. Often, a picture in a video will share similar content with the previous picture. This has profound consequences to both compression and filtering. Compression benefits because a block in a current picture may be predicted as a displaced, warped, or weighted block in some previous picture. The displacement parameters are called motion vectors and are needed in order to create the motion-compensated prediction of the current block. If the motion model that is used to predict the current block is efficient enough, then the difference between the current block and its motion-compensated prediction will be low, and hence easy to compress. However, filtering can benefit as well. If the prediction is close enough to the current block in the picture, then it can be surmised that the prediction block is none other than the current original block with different noise characteristics. The current block, however, is also assumed to be a distorted version of the original source block, again with a different set of noise characteristics. If the noise in each block is assumed to have zero mean and is not correlated, then simply averaging the current block with its prediction block from some other reference picture will create a new block with halved error/noise energy, which is closer to the original source block. This can be extended to weighted combinations of arbitrary number of prediction blocks that originate from multiple reference pictures.

Motion-compensated temporal analysis has also been used within the context of temporal wavelets for video compression. See, for example, Y. Andreopoulos, A. Munteanu, J. Barbarien, M. van der Schaar, J. Cornelis, and P. Schelkens, "In-band motion compensated temporal filtering," *Signal Processing: Image Communication*, vol. 19, pp. 653-673 and D. S. Turaga, M. van der Schaar, Y. Andreopoulos, A. Munteanu, and P. Schelkens, "Unconstrained motion compensated temporal filtering (UMCTF) for efficient and flexible interframe wavelet video coding," *Signal Processing: Image Communication*, Volume 20, Issue 1, pp. 1-19. Motion-compensated temporal filtering has been applied both on the original pixel values (see "Unconstrained motion compensated temporal filtering (UMCTF) for efficient and flexible interframe wavelet video coding" cited above) as well as to values that have been transformed to the frequency domain (see "In-band motion compensated temporal filtering" cited above). The video sequence is divided into groups of pictures each of which is coded independently. Within those groups, motion-compensated temporal analysis is used to provide motion-compensated predictions for a subset of the pictures. The motion-compensated prediction errors are then used to refine the remaining pictures, which are again predicted using motion compensation. The final motion-compensated prediction errors are coded. Even though MCTA within a video coder is not addressed by this disclosure, some of the methods presented in this disclosure may be applicable on video coders that use motion-compensated temporal filtering.

Filtering is one of the applications that benefits from the use of motion-compensated temporal analysis. An early algorithm for denoising based on motion-compensated temporal filtering is found in E. Dubois and S. Sabri, "Noise reduction in image sequences using motion-compensated temporal filtering," *IEEE Transactions on Communications*, Vol. COM-32, no. 7, pp. 826-831. A review of the first contributions in this field is presented in J. C. Brailean, R. P. Kleihorst, S. Efstratiadis, A. K. Katsaggelos, and R. L. Lagendijk, "Noise reduction filters for dynamic image sequences: A review," *Proceedings of the IEEE*, vol. 83, pp. 1272-1292, September '95. More recent approaches for pre-filtering based on MCTA are presented in J. Llach and J. M. Boyce, "H.264 encoder with low complexity noise pre-filtering," *Proc. SPIE, Applications of Digital Image Processing XXVI*, vol. 5203, p. 478-489, August '03; A. McInnis and S. Zhong, "Method and system for noise reduction with a motion compensated temporal filter," United States Patent Application Publication No. 20070014368; and H.-Y. Cheong, A. M. Tourapis, J. Llach, and J. Boyce, "Advanced Spatio-Temporal Filtering for Video De-Noising," in *Proc. IEEE Int. Conf on Image Processing*, vol. 2, pp. 965-968. "H.264 encoder with low complexity noise pre-filtering" (cited above) describes the use of the motion compensation module within an H.264/AVC video coder to perform temporal filtering. Multiple motion-compensated predictions from past pictures were generated and averaged and blended with the current picture to implement temporal filtering. The picture was also spatially filtered with a threshold-based 3×3 pixel-average filter. A more advanced and general approach is proposed in "Advanced Spatio-Temporal Filtering for Video De-Noising" (cited above), which takes into account both past and future pictures. The combination of the multiple motion-compensated predictions that originate from different pictures is done using a weighted average that adapts to the characteristics of the source signal. Furthermore, spatial filtering adopts a combination of wavelet filtering and Wiener filtering. The motion-compensated temporal analysis module that follows the architecture presented in "Advanced Spatio-Temporal Filtering for Video De-Noising" (cited above) is described in more detail below.

FIG. 1 shows a block diagram of a Motion-Compensated Spatio-Temporal Filter which implements Motion-Compensated Temporal Analysis. The input to the MCTA module shown in FIG. 1 are image pixels, and, optionally, motion and spatial filtering parameters that initialize motion modeling and spatial filtering in the analysis module. The processing arrangement consists of the following main components:

1. Spatial filters (wavelets, Wiener filter, among others).
2. Motion estimation and compensation with an arbitrary motion model.
3. Spatio-temporal de-blocking filter (optional).

4. Texture analysis (e.g. through spatial frequency analysis).

5. Luminance and chrominance information module.

The bi-predictive motion estimation (BME) modules 110 in FIG. 1 perform bi-predictive motion estimation, while the motion estimation (ME) modules 120 perform uni-predictive motion estimation. The subscripts denote the temporal distance of the reference pictures with respect to the current picture. The bi-predictive motion-compensation (BMC) modules 130 perform bi-predictive motion-compensation using as motion vectors the ones derived at the respective BME modules 110. Similarly, the motion compensation (MC) modules 140 perform uni-predictive motion-compensation with the motion vectors from the respective ME modules 120. The spatial (SP) filters 151, 153, 155, 157 perform a variety of functions that include high- and low-pass filtering and de-blocking, among others. Buffers Buff1 161 and Buff2 163 contain previous and future spatially and temporally filtered pictures. The weights w are adjusted to minimize the prediction error. The input picture may be spatially filtered by one of three available spatial filters 151, 153, 155, whose parameters are tunable depending of the statistics of pictures that have been already processed by the MEMC component. Note that spatio-temporal filtering topologies other than that specifically depicted in FIG. 1 may be used. For example, the BME modules 110 may operate on frames at different temporal distances, such as −M, +N.

Each input picture undergoes motion estimation with some reference picture, to yield a motion-compensated prediction of that picture. The input image is divided into pixel blocks or areas that may have an arbitrary size (e.g. 8×8 pixels). For this disclosure, the terms block, region or area of the picture are used inter-changeably. A block in the current picture n is matched using motion estimation with a prediction block that is generated from some part of a reference, picture n−k. The ME component determines the motion parameters that point to the prediction block. To generate this prediction block, the MC module 140 requires the motion parameters that are passed on by the ME module 120. The selected motion parameters minimize some cost between the original current block and the derived prediction block. Among many possible costs, one that may be used is the Mean Absolute Difference (MAD) between the original and the predicted block. An alternative cost could involve the sum of the MAD plus a value that represents motion field similarity. Motion field smoothness or similarity requires that motion parameters belonging to neighboring blocks are similar or correlated. Motion field similarity lowers the number of bits required to code the motion parameters, and can reduce blocking artifacts when applied to produce a motion-compensated prediction of the current picture.

In general, the motion-compensated (MC) prediction of picture n from picture n−k creates a prediction block that is drawn from picture n−k. Then the MC component takes the prediction blocks from reference picture n−k and combines them to form a motion-compensated picture that is the best approximation to picture n. Note that the motion model used in the ME and MC modules 120, 140 may utilize any known global and local motion model, such as the affine and translational motion models.

Motion estimation and compensation is not constrained to the previous picture alone as shown in FIG. 1. In fact, k can take positive and negative values and motion compensation utilizes multiple references pictures, as shown in FIG. 2. FIG. 2 shows prediction of the current picture using a weighted linear combination of blocks originating from pictures in the past and the future. One hypothesis uses picture n−1 as a reference, while another will use picture n−N. Pictures n+1 through n+N are used as well. Note that using reference pictures from the future entails delay, as up to N future pictures will have to be buffered prior to completing the motion estimation of picture n. For low delay applications, one could constrain motion compensation to employ past pictures as references.

The motion-compensated prediction of a block in picture n may also be a linear weighted combination of more than one prediction blocks that are originating from different reference pictures. In one possible arrangement, the current block in picture n could be predicted as the linear weighted combination of a prediction block derived from picture n−2 and a prediction block derived from picture n+1. This particular prediction structure is also known as bidirectional prediction. In another possible configuration, the prediction block could be a linear weighted combination of a prediction block derived from picture n−1 and another prediction block derived from picture n−2. The generalized prediction (weighted prediction with a translational motion model) is shown in Eq. 1 below as:

$$\tilde{p}_n(i,j) = \sum_{k=-m}^{+m} (\alpha_k \times p_{n-k}(i+v_{x,k}, j+v_{y,k})) + o \quad \text{Eq. 1}$$

Disregarding fractional-pixel motion-compensated prediction, pixels $p_n(i,j)$ of a block in picture n can be predicted as a linear weighted combination of displaced blocks in pictures n−m through picture n+m. Note that m is a positive number. In other possible realizations, the combination need not be linear.

Note that a special case of motion estimation and compensation with multiple hypotheses as described in Eq. 1 is the so-called overlapped block motion estimation and compensation. In FIG. 18 an example of overlapped block motion compensation and estimation is depicted. In FIG. 18, the center part of the block is predicted as a single prediction block using a single motion vector (MV), however, the block boundaries are all weighted linear averages of both the prediction samples that are produced by using the current block MV as well as samples produced by using MVs of neighboring blocks. For example, the top overlapping area is a weighted average of both the current MV and the MV of the block at the top of the current block. The overlapping area at the top left is similarly a weighted average of samples predicted using four MVs, those of the current, left, top-left, and top blocks. Such techniques can reduce blocking artifacts at block edges, among other benefits.

Motion estimation schemes may also adopt hierarchical strategies. Hierarchical strategies may both improve estimation performance by avoiding local minima but may also help even with estimation speed. In general, these schemes perform some kind of spatial sub-sampling resulting to an image pyramid where at each level the input image may be sub-sampled by a constant ratio, e.g., 2. Motion estimation is first performed at the highest (lowest resolution level) hierarchy level. Then the MVs derived at this level are normalized to the next lower level (e.g. multiplied by 2) and are used as predictors or constraints for the next level. ME is performed again at the next level, using the scaled MVs as predictors and constraints. This process iterates until one derives MVs at the original highest resolution. Using previous levels as predictors one may limit the search range for the next level.

The MEMC framework can generate multiple MAD prediction error metrics as shown in FIG. 3 and FIG. 4. FIG. 3 shows MAD calculation using the MEMC framework and one reference from the past. FIG. 4 shows MAD calculation using the MEMC framework and two references from the future. One set of prediction error metrics is generated during motion estimation and corresponds to each reference block or combination of reference blocks, which in turn can originate from different pictures. The second one can be calculated after motion compensation has been completed for all blocks in the current pictures. Motion-compensation may create unwanted blocking artifacts. These artifacts can be reduced by applying a de-blocking filter on the final motion-compensated picture. Furthermore, the blocks constituting the final prediction picture do not necessarily originate from the same frame (blocks may be selected from among several reference frames). For example, one block could be the weighted combination of blocks in pictures n−1 and n−2, while another block could be predicted from picture n+2. Consequently, the MAD prediction error between this final prediction picture and the original picture may not be the same as the sum of the ME prediction errors. For example, the application of de-blocking on the final motion-compensated prediction parameter may result in a difference between the MAD prediction error and the sum of the ME prediction errors.

The motion-compensated temporal analysis module can be used to improve compression performance and the quality of filtering. The module may improve picture and scene complexity classification (pre-analysis). Pre-analysis can affect compression performance and visual quality considerably. It may be used to classify scenes and shots, detect scene changes and gradual scene transitions such as fades. It is also useful for pre-estimating scene complexity, which can then be used to optimize bit rate allocation and the motion-compensated prediction structure used at the video coder (e.g. if, and how many, and where to place bi-predictive coded pictures).

The complexity of a temporal analysis system may be considerable. Consider the example where each input picture is predicted using motion compensation using two past pictures and two future pictures. Initially, each picture block may be predicted from a single block from one of the four possible reference pictures. This will require conducting costly motion estimation four times. However, as shown in Eq. 1, a prediction block may be formed by linearly combining an arbitrary number of prediction blocks originating from different (or even the same) reference pictures. For multiple hypotheses, e.g. predicting a block as a linear combination of multiple prediction blocks corresponding to different MVs and even different reference pictures, one has to jointly estimate multiple motion vectors. Note here that a motion vector that is optimal when used for uni-prediction may not be the same with the optimal motion vector for the same reference picture when it is one of the multiple averaged references. One may do that to simplify estimation but the result will be suboptimal. Only a joint estimation of all MVs will provide the optimal performance. However, computationally this is often infeasible. Even if this is constrained to bi-predictive motion estimation, this will require joint optimization of motion estimation for two blocks, 0 and 1 (which will essentially entail testing all the pairwise combinations of the reference frames). To accomplish this, it has been proposed to apply iterative motion estimation where prediction block 0 is fixed and motion estimation is applied to find the best prediction block 1. In the next step, block 1 is fixed, and motion estimation is applied to find a new and better block 0. Then again, block 0 is fixed and motion estimation is applied to refine block 1, and so on. Hence, even though temporal filtering can improve compression performance and visual quality, it is very complex and is usually reserved for high-end applications such as DVD and broadcast encoding, where computational complexity is not a big issue.

The complexity cost of motion-compensated pre-analysis becomes prohibitive for applications that are power and memory-constrained. Power usage suffers due to the large number of motion estimation calculations that have to be performed for each combination of input picture and its possible reference pictures. Furthermore, memory complexity is high due to the large number of past and future reference pictures that have to be maintained in memory during the motion estimation and compensation process. Memory complexity suffers because the size of motion compensation references may be orders of magnitude larger than the original input size. If, for example, quarter-pixel motion compensation is used to predict a block, then the memory, which is required to store the quarter-pixel accurate picture reference, will be 4×4=16 times the memory required to store the original input picture.

Therefore, methods and systems that reduce the computational and memory complexity of motion-compensated temporal pre-analysis while at the same time taking care to achieve high performance pre-analysis, filtering, and motion parameter generation are desirable.

BRIEF DESCRIPTION OF DRAWINGS

FIG. 6 is a block diagram of motion-compensated temporal pre-analysis.

FIG. 7 illustrates buffered pictures for pre-analysis.

DESCRIPTION OF EXAMPLE EMBODIMENTS

Figure 1:
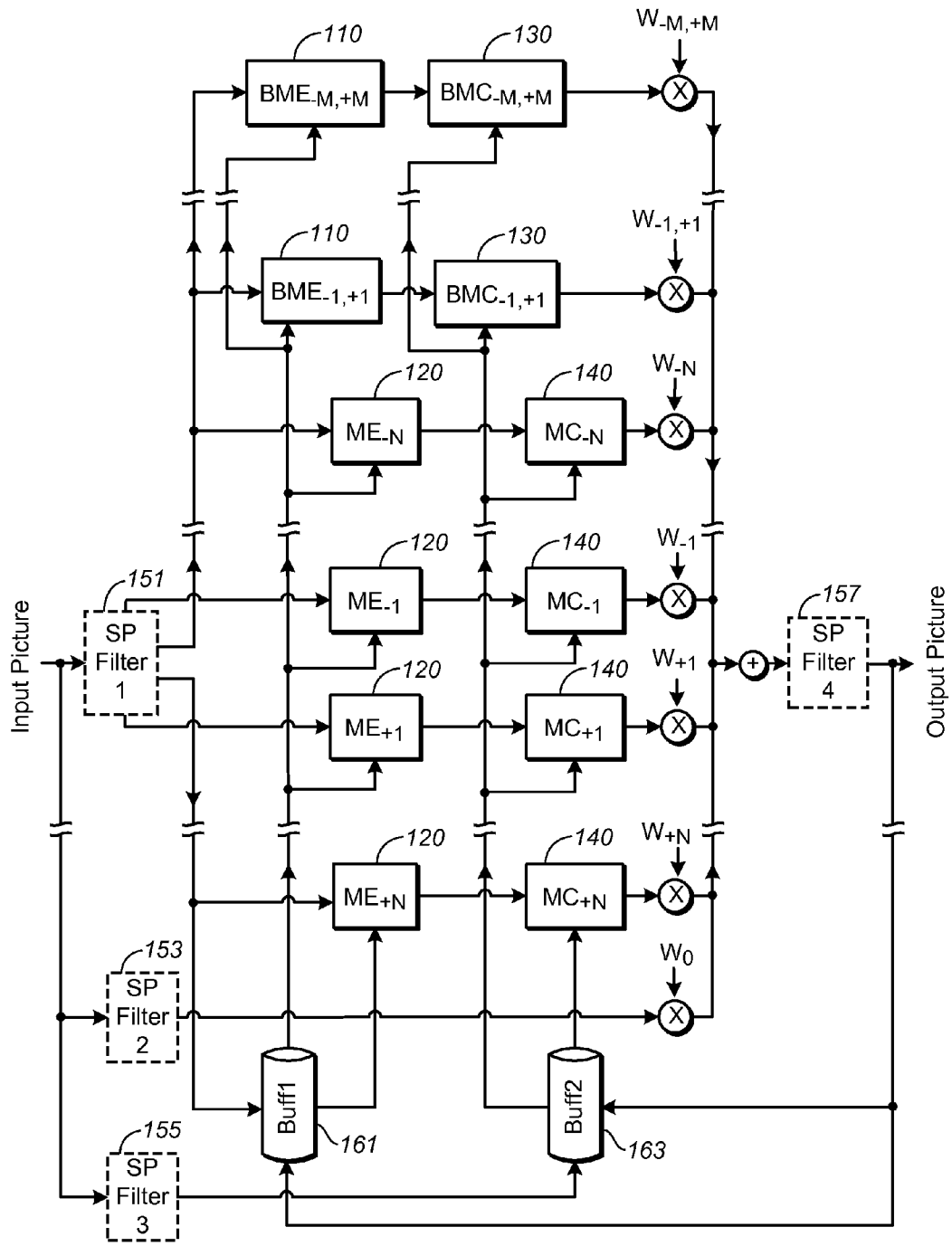
FIG. 1 is a block diagram of a Motion-Compensated Spatio-Temporal Filter.
Figure 2:
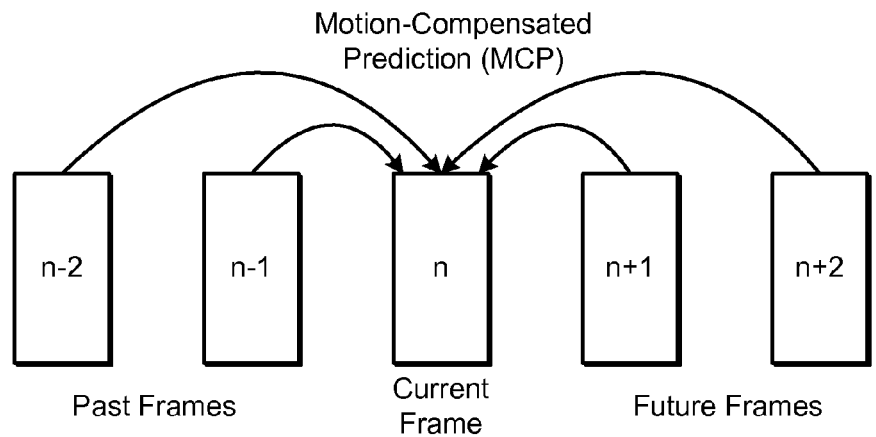
FIG. 2 illustrates prediction of the current picture using a weighted linear combination of blocks originating from pictures in the past and the future.
Figure 3:
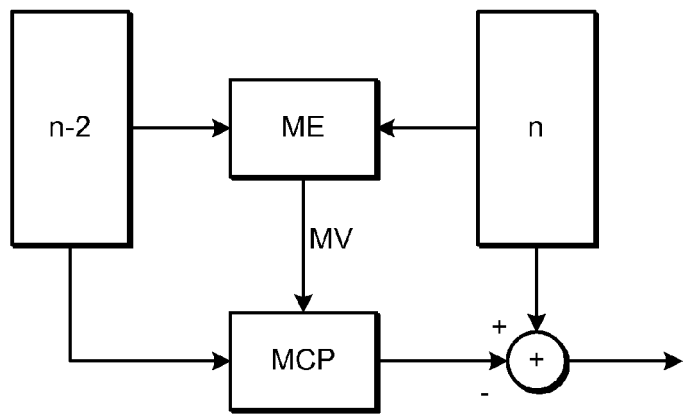
FIG. 3 shows MAD calculation using the MEMC framework and one reference from the past.
Figure 4:
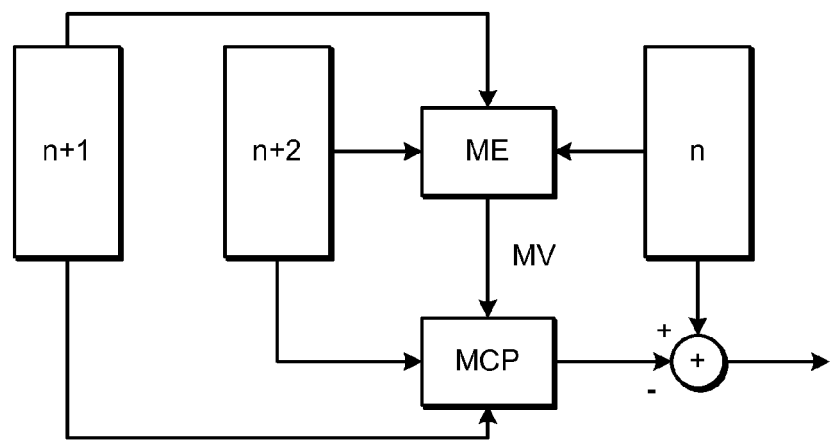
FIG. 4 shows MAD calculation using the MEMC framework and two references from the future.

In the following description, for the purposes of explanation, numerous specific details are set forth in order to provide a thorough understanding of the present invention. It will be apparent, however, that embodiments of the present invention may be practiced without these specific details. In other instances, well-known structures and devices are shown in block diagram form in order to avoid unnecessarily obscuring the present invention.

The disclosure below describes a method for reduced-complexity temporal pre-analysis of video sequences using motion prediction/compensation. A generic diagram of such a system can be found in FIG. 6. Such a system consists of the following main components: (a) a spatial down-sampling module 610, (b) the motion-compensated pre-analysis component 620, (c) the pre-filter 630, and (d) the video encoder 640. The pre-analysis component 620 receives both an input frame 601 and a sub-sampled frame 603 generated by the down-sampling module 610. A motion-compensated temporal analyzer has high computational and memory complexity due to the process of motion estimation, which is proportional to the possible combinations of available reference pictures for motion-compensated prediction. The complexity can be reduced with a variety of ways that are listed immediately below:

(a) The number of pictures that are processed can be reduced via sub-sampling. This method adopts temporal sub-sampling.

(b) The number of references used for motion estimation and compensation may also be reduced.

(c) The input pictures may be spatially sub-sampled using some sort of a down-sampling spatial filter or optionally some kind of bit-depth sub-sampling/reduction technique. Approaches for complexity reduction are described in additional detail below.

In general, this disclosure will refer to two types of samples, the sampled input pictures, which are predicted from other reference pictures, and the reference picture samples that denote the reference pictures that are being used for motion-compensated prediction of sampled input pictures.

The actual arrangement differs given the target application and affects the efficiency of the overall pre-processing system. The methods discussed herein may be characterized given the application for which they are intended. The target applications are enumerated below:

(a) Picture and scene complexity classification.
(b) Bit rate allocation. This closely depends on (a).
(c) Video coder prediction structure determination. This also closely depends on (a).
(d) Pre-filtering.

Six embodiments of the present invention are summarized immediately below. These embodiments will be described in further detail in a later portion of this disclosure. Those skilled in the art will understand that these six embodiments are example embodiments and additional embodiments are within the scope of this disclosure.

In a first exemplary embodiment, the reference picture samples are reduced for certain sampled input pictures while all input pictures are sampled for processing. The number of reference picture samples can be reduced for all or certain sampled input pictures. The pattern of reduction may be arbitrary but preferably it is organized in such a way so that the missing statistics and parameters may be inferred from the produced parameters. The pattern may also be periodic and it can also adapt to the statistics of the underlying video sequence. For example, a low motion video sequence may require a low sampling rate while a high motion video sequence may require a high sampling rate. As described in additional detail below, processing according to this first embodiment may adapt to the content.

The above sampling rates refer to the reference picture samples. This complexity reduction technique is compatible with all of the four applications listed above.

In a second exemplary embodiment, all pictures are processed with the same number of reference pictures and, in contrast to the first embodiment, the number of sampled input pictures is smaller than the total number of input pictures (temporal down-sampling). This is a case of temporal down-sampling of the input pictures. Only a subset is processed in the pre-analysis module. The down-sampling pattern can be arbitrary or can be periodic. Optimally, it adapts to the underlying statistics of the video signal. For example, a scene with a lot of activity might have to be sampled very frequently, while a scene with low motion can be sampled with a lower frequency. The decision on how to adapt the sampling frequency can be derived by processing past statistics that include motion-compensated prediction errors (such as SAD or MSE values) and motion model parameters (motion vectors and weighting prediction/illumination compensation parameters). Similarly to the previous embodiment, processing according to this second embodiment may adapt to the content. Sub-sampling the sampled input pictures by a factor of one to two could reduce the complexity of the pre-analysis system by half. This complexity reduction technique is compatible with applications (a), (b), and (c). Temporal filtering will be sub-optimal.

In a third exemplary embodiment, the algorithms described in both the first exemplary embodiment and the second exemplary embodiment are combined to enable sub-sampling of both the sampled input pictures and the reference picture samples. The sample patterns are either random, or periodic, or arbitrary, or adapt to the underlying statistics of the video sequence for increased performance with respect to the target applications. Similarly to the embodiments described above, processing according to this embodiment may also adapt to the content. Potentially, all applications listed above are compatible with this exemplary embodiment.

In a fourth exemplary embodiment, which can be combined with any of the above embodiments described above, the input picture is in addition sub-sampled (down-sampled) in the spatial domain. This embodiment is not directly compliant with the pre-filtering application (d). However, it can help reduce complexity drastically (e.g. by a factor of 4 for a down-sampling factor of 2 in each spatial dimension), and still maintain sufficiently good performance for applications (a), (b), and (c). Similarly to the embodiments described above, processing according to this embodiment may adapt to the content.

In a fifth exemplary embodiment, an algorithm is used that can ensure reliable scene characterization in the case of sampled input picture and reference picture sample downsampling (see the third exemplary embodiment described above). This embodiment maintains prediction error statistics and if these surpass some threshold then a binary search is initiated, whose objective is the detection of scene transitions, such as scene changes and fades, which occur in pictures that were not sampled as either sampled input pictures or reference picture samples.

The content adaptation of the fifth exemplary embodiment is possible as follows. The information that drives the adaptive sub-sampling may come from a prior pre-analysis pass (described below in the sixth exemplary embodiment) or by processing past pre-analysis statistics. A model of the motion may be created and used to try to predict motion given past behavior in the scene. If past images had high motion, then sample frequently, if not, then sample less frequently. Fallbacks could also be included (if less frequent sampling is performed, but it is seen that the motion is high, then further intermediate samples may be obtained to avoid errors).

In a sixth exemplary embodiment, the previous embodiments may be modified to create a hierarchical pre-analysis system where a first analysis at a certain spatio-temporal resolution is performed, and then, given the results of that analysis, the spatial resolution or the temporal resolution or both resolutions are increased and the analysis further refined. This pre-analysis may provide that the processing described in the embodiments above then adapts to the content of the information provided. An advantage of performing an analysis at a lower temporal or spatial resolution is that, overall, the motion analysis is less complex, since e.g. fewer samples are searched. However, lower resolution searches can be less accurate, so embodiments of the present invention may incorporate the hierarchical analysis system described above, to improve the overall accuracy of the motion estimation while allowing for the reduction in the complexity of the estimation.

A system according to an embodiment of the present invention comprises: (a) a temporal pre-analysis motion estimation and compensation module; (b) a spatial down-sampling module; (c) a buffering memory module that introduces delay and enables using future reference picture for motion-compensated prediction; and (d) an optional video encoder that adapts its coding parameters, bit allocation, and prediction structure to the information that it receives from the pre-analysis module. The system may additionally comprise a pre-filter that receives motion parameters and other control information from the pre-analysis module.

Figure 5:
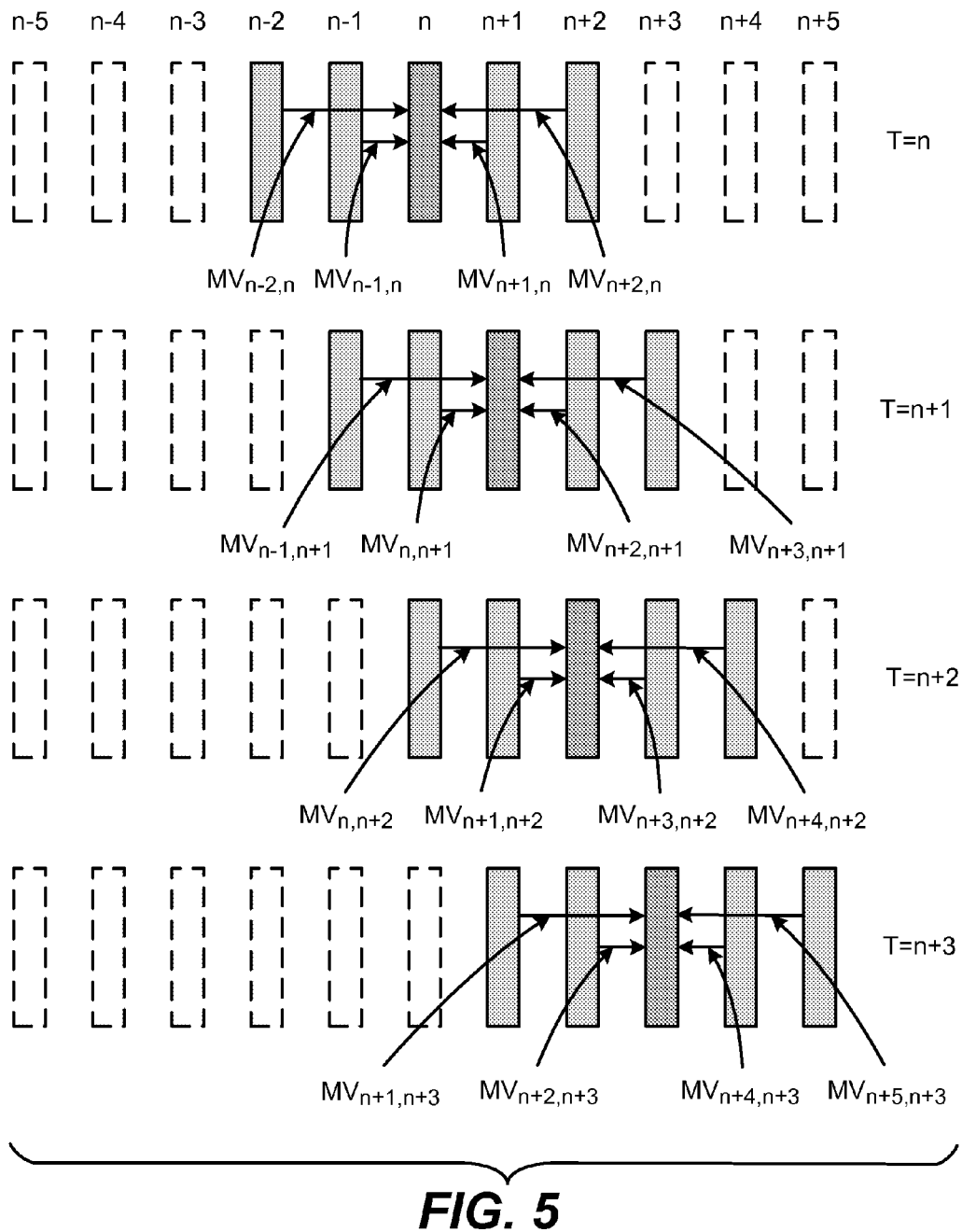
FIG. 5 shows a motion compensation process with two past pictures and two future pictures used as references.
Figure 10:
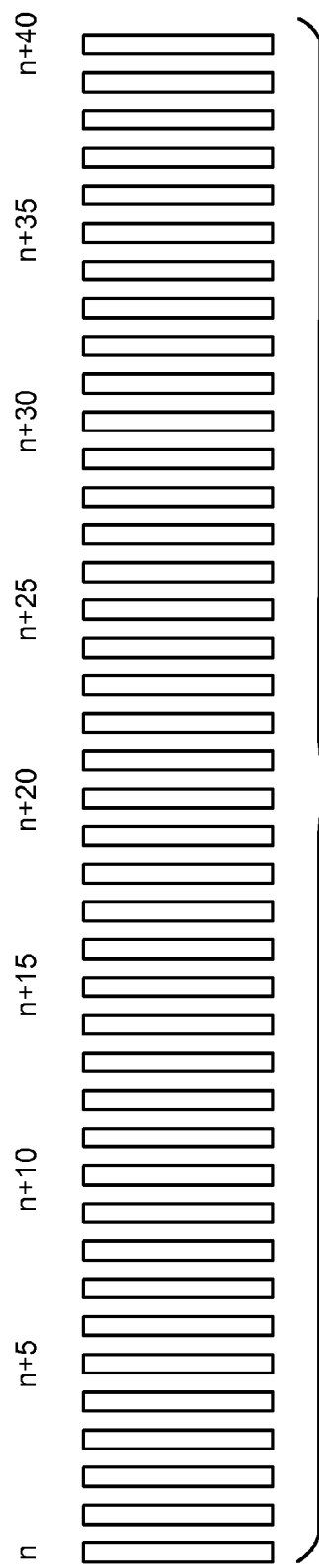
FIG. 10 illustrates temporal pre-analysis by sampling all of the pictures.

Embodiments of the present invention reduce the complexity of a motion-compensated temporal pre-analysis and pre-filtering system through the use of spatiotemporal sub-sampling. Picture buffering for a generic pre-analysis system is illustrated in FIG. 7. Either all or some of the input pictures are buffered and motion-compensated temporal analysis is performed for the so-called current picture (the one with the darkest shade) using as prediction references pictures from both the past and the future. In traditional motion-compensated temporal analysis as shown in FIG. 10, all input pictures are sampled and processed using MCTA. Consider, for example, the case of FIG. 5 where two motion compensated references from the future and two from the past are used to predict the current picture. Let $MV_{u,v}$ denote the motion parameters that predict picture v from picture u that are derived using motion estimation. At time instance T=n picture n is predicted from picture n−2 using motion parameters $MV_{n-2,n}$ and is also predicted from picture n−1 using motion parameters $MV_{n-1,n}$. Picture n is also predicted from picture n+2 using motion parameters $MV_{n+2,n}$ and from picture n+1 using motion parameters $MV_{n+1,n}$. Then, moving on to the next picture, picture n+1 is predicted from picture n−1 using motion parameters $MV_{n-1,n+1}$ and is also predicted from picture n using motion parameters $MV_{n,n+1}$. Again, prediction takes place from future pictures: picture n+1 is predicted from picture n+2 using motion parameters $MV_{n+2,n+1}$ and is also predicted from picture n+3 using motion parameters $MV_{n+3,n+1}$. The same process is continued for all sampled input pictures: n+2, n+3, etc. To simplify examples discussed here, assume that each prediction (of the four here) is derived from a single picture. The embodiments described below are also applicable for cases where each prediction is comprised of blocks that originate from different reference pictures.

Figure 8:
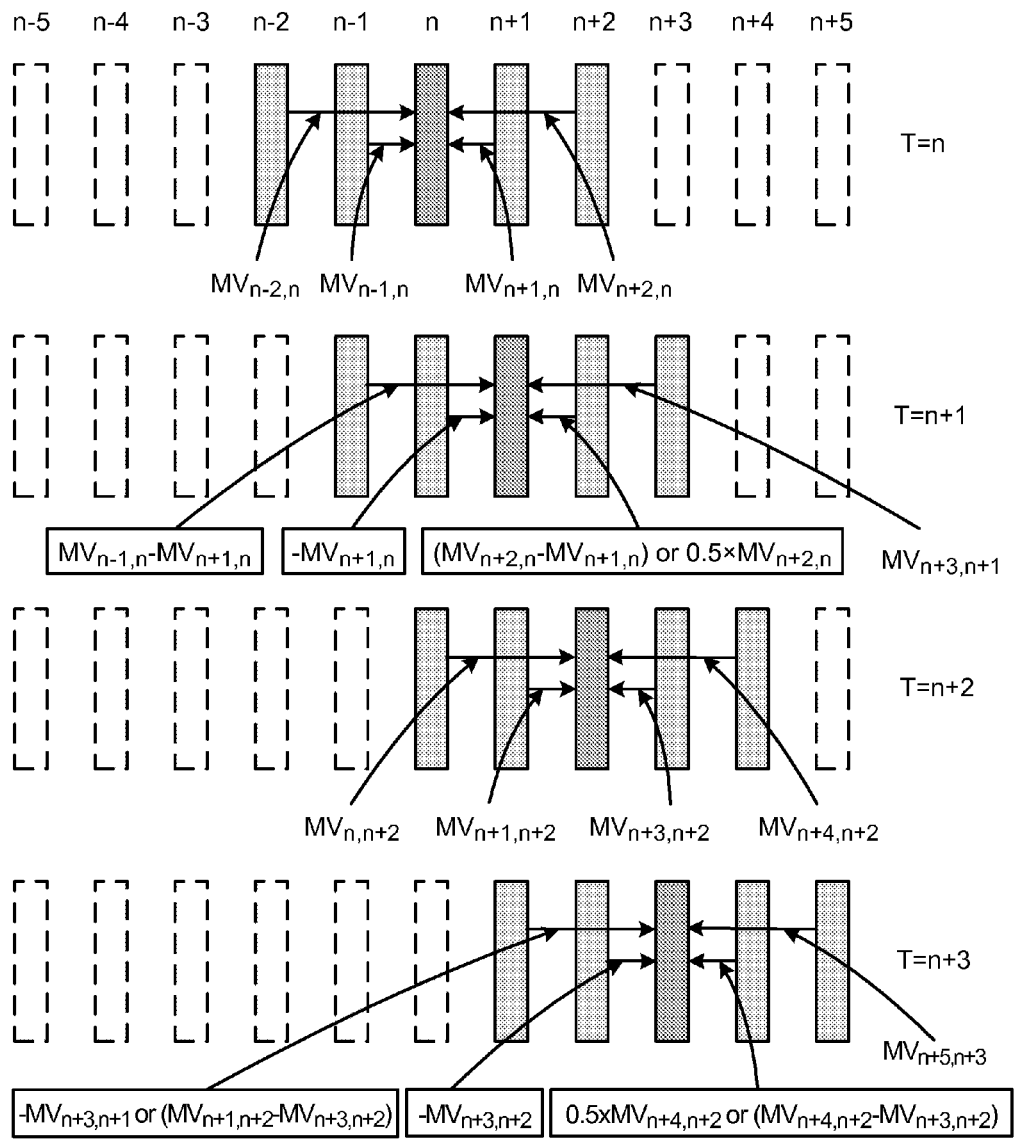
FIG. 8 shows low complexity temporal motion-compensated pre-analysis with four motion analyses for odd frames and 1 motion analysis for even frames and 1:2 sub-sampling.

In a first exemplary embodiment, the reference picture samples number varies with each sampled input picture. No temporal down-sampling is performed in terms of processing the input pictures: all input pictures are sampled and processed. In one example, assuming a maximum number of reference picture samples for each sampled input picture, the number of reference pictures that are used for motion estimation and compensation are reduced for certain sampled input pictures. In one possible arrangement of this method, the sampling pattern for reference picture samples is periodic, with a period of two, and is illustrated in FIG. 8. Motion estimation and compensation remains unchanged for the even numbered input pictures. However, for odd pictures, the motion estimation and compensation operations are constrained. Out of four operations, only one is executed, from the farthest future picture to the current picture. For example, for time instance n+1, picture n+1 is predicted using as reference picture n+3, that yields motion model parameters $MV_{n+3,n+1}$. The same is true for picture n+3 that is predicted using as reference picture n+5, that yields motion model parameters $MV_{n+5,n+3}$. The motivation to constraining motion prediction to the farthest picture has to do with the inability to reconstruct these motion parameters if motion prediction is not available. The three missing motion parameters for picture n+2, however, can be inferred from motion parameters of previous sampled input pictures. Consider for example picture n+3. The missing motion parameters are $MV_{n+1,n+3}$, $MV_{n+2,n+3}$, and $MV_{n+4,n+3}$.

In one embodiment, the missing parameters may be estimated as follows:
   (a) $MV_{n+1,n+3}$ is estimated as either $-MV_{n+1,n+3}$ that is available by processing picture n+1 or as ($MV_{n+1,n+2}-MV_{n+3,n+2}$) that are available after processing picture n+2. The minus sign denotes that the signs of the translational motion parameters are reversed. In the case of weighted prediction parameters, the weights are multiplied (for plus sign) or divided (for minus sign). For higher order motion models, some type of projection or motion threading is used to follow the motion from one picture to the other.
   (b) $MV_{n+2,n+3}$ is estimated as $-MV_{n+3,n+2}$ that is available by processing picture n+2.
   (c) Last, $MV_{n+4,n+3}$ is estimated as either $0.5 \times MV_{n+4,n+2}$ that is available from processing picture n+2 or as ($MV_{n+4,n+2}-MV_{n+3,n+2}$) that are available after processing picture n+2.

A similar approach can be used for estimating the motion parameters of sampled input picture n+1. These reconstructed parameters can then be used for picture and scene classification, filtering and video coding optimization as one would use the original parameters. In the case that the video coder operator is not certain about their reliability, some functions may be constrained, i.e. during the weighted linear combination that produces the prediction block, the weights that are used to average the unreliable predictions might be lowered compared to those for the more reliable predictions.

The number of reference pictures used for motion-compensated prediction can be reduced for all or certain sampled input pictures. The down sampling patterns may be arbitrary but preferably are organized in such a way so that the missing statistics and parameters may be inferred from the produced parameters as described above. In the exemplary embodiment described above, the down-sampling ratio was approximately 1 over 2. In general, motion prediction is disabled in such a way (periodic or seemingly arbitrary) that the missing motion parameters can be easily estimated from the motion parameters of pictures that were fully processed. This can be done either from a single direction (the past) or both directions (the past and the future). The sub-sampling pattern may also be periodic and it can also adapt to the statistics of the underlying video sequence. For example, a low motion video sequence would require a low sampling rate while a high motion video sequence will require a high sampling rate. The above sampling rates refer to the reference picture samples. The reduction of the number of reference pictures may be organized in the manner of the hierarchical pre-analysis system described above.

Figure 13:
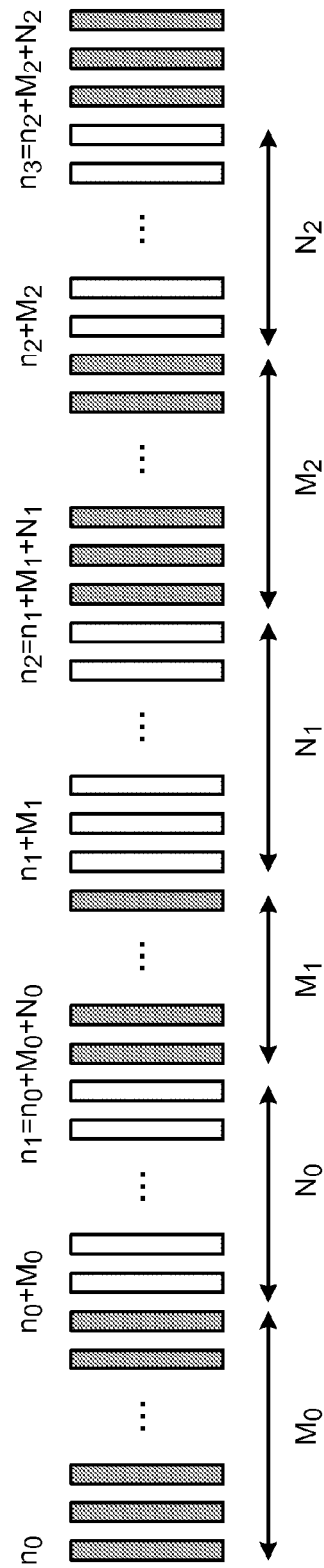
FIG. 13 shows a generic temporal pre-analysis sub-sampling structure.
Figure 14:
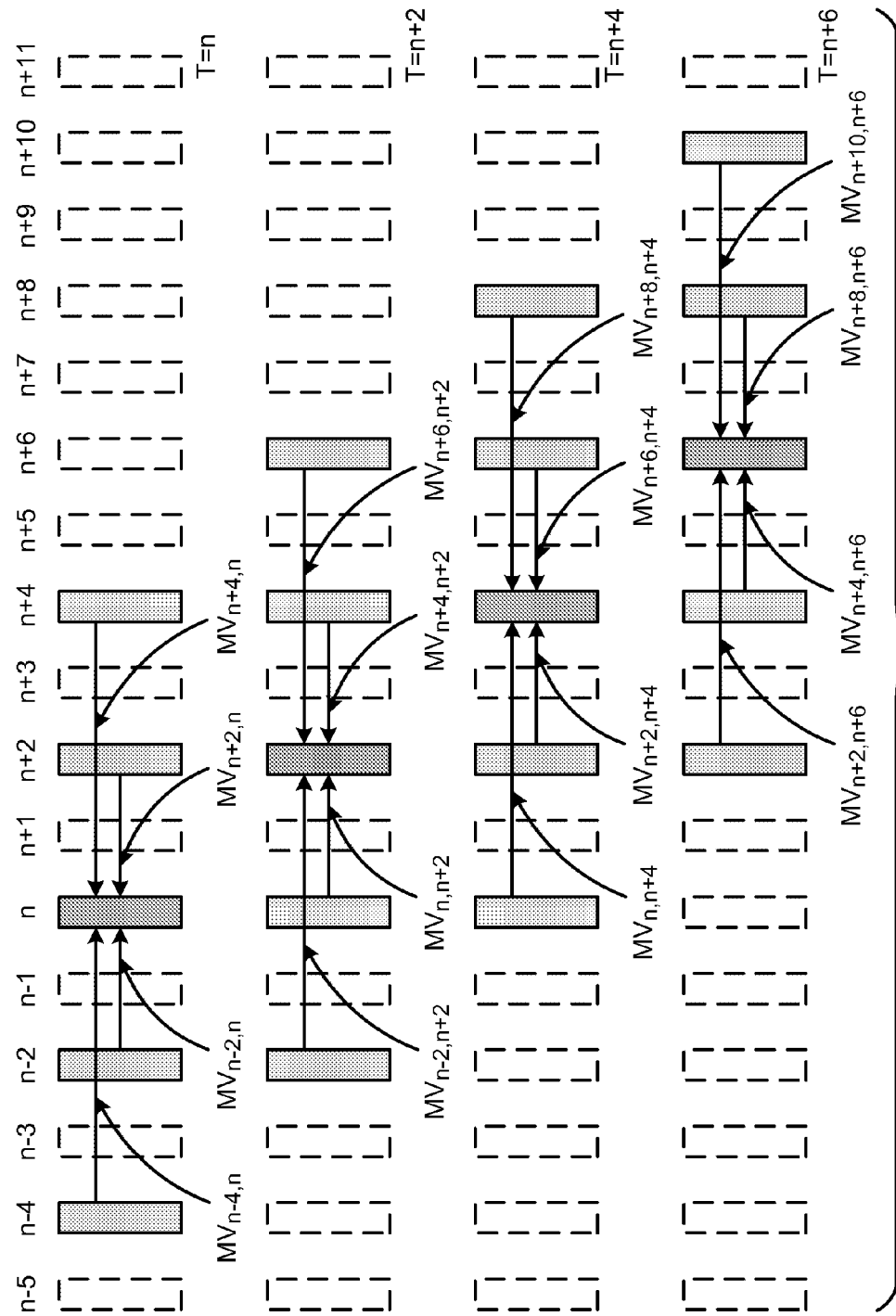
FIG. 14 shows temporal sub-sampling of analyzed pictures and reference pictures where video sequence is analyzed at half the frame rate.

In the second exemplary embodiment, the number of reference picture samples is kept the same and, in contrast to first exemplary embodiment, the number of sampled input pictures may be less than the total number of input pictures. Furthermore, reference pictures for motion-compensated prediction are drawn only from the input pictures that are sampled. A special case of this method would be to analyze the 15 frames per second version of an originally 30 frame per second video sequence. This case is shown in FIG. 14. Instead of sampling all of the input pictures as in FIG. 10, the sampling pattern can be as generic as the one shown in FIG. 13. The down-sampling pattern can be arbitrary or can be periodic. Sub-sampling the sampled input pictures by a factor of one to two could reduce the complexity of the pre-analysis system by half. Exemplary sampling patterns include the patterns shown in FIG. 11 and FIG. 12.

Figure 11:
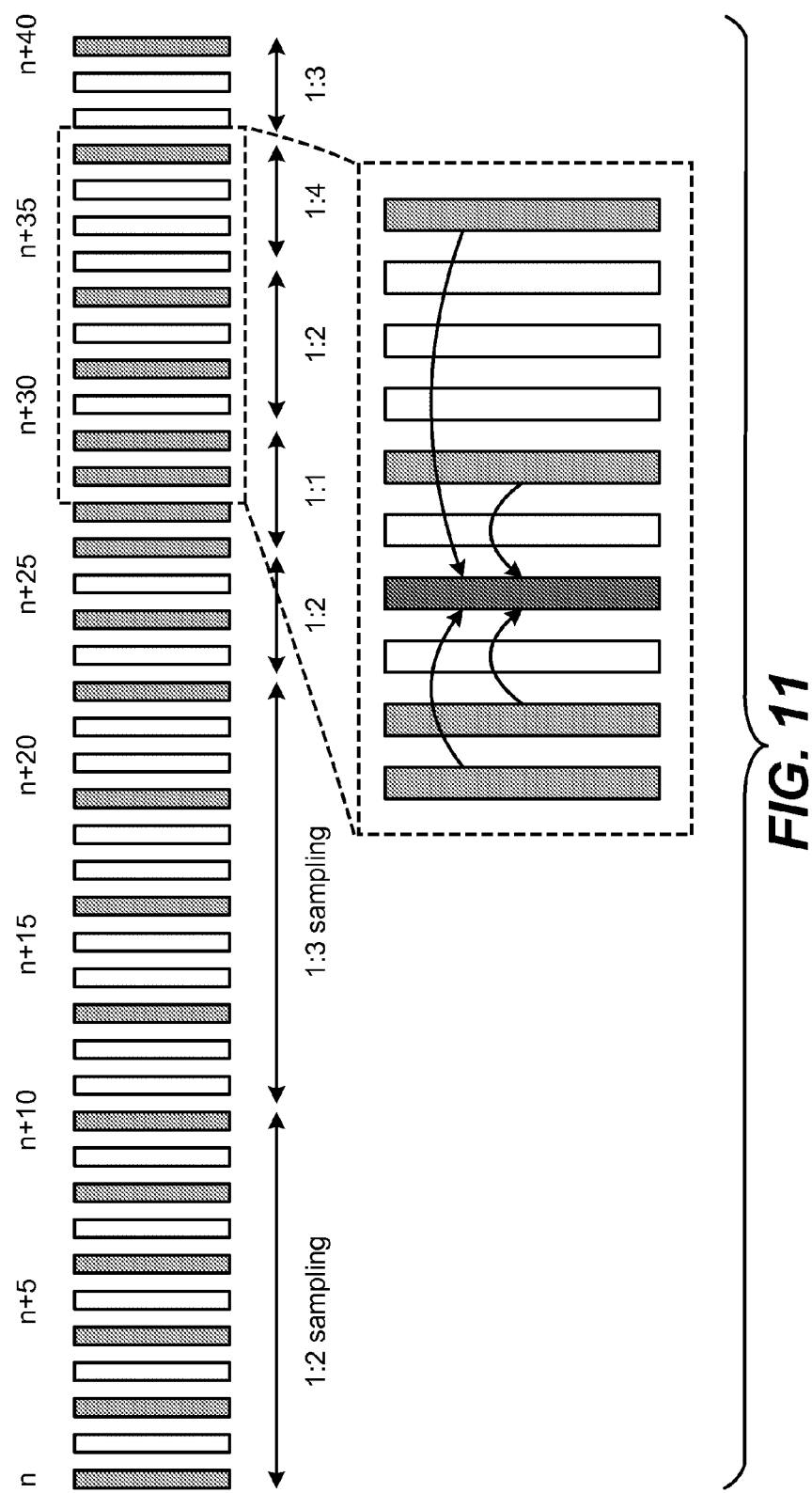
FIG. 11 shows temporal pre-analysis with adaptive sampling of pictures.

The sampling pattern shown in FIG. 11 adapts the sampling frequency of the input pictures to the statistics of the input video. The inputs pictures are initially being sampled at half the input rate, then one-third of the input rate, followed by sampling at half the input rate, then at a rate equivalent of the input rate, and so on. The inset figure in FIG. 11 shows some details for pictures n+28 to picture n+37: out of those 10 pictures, five are being sampled and processed with motion-compensated temporal analysis. As an example, the analysis of picture n+31 is described. Picture n+31 is predicted from two past pictures, the closest temporal that have been sampled: picture n+28 and picture n+29. It is also being predicted from two future pictures: n+33 and n+37.

A scene with a lot of activity might have to be sampled very frequently, while a scene with low motion can be sampled with a lower frequency. The decision on how to adapt the sampling frequency can be derived by processing past statistics that include motion-compensated prediction errors and motion model parameters (motion vectors). Another way to adapt the sampling frequency is through some lookahead: once every few frames the current frame, frame n, is predicted using frame n+N (N is positive), where N is sufficiently large. Depending on the value of the prediction error with respect to some pre-defined or fixed thresholds, one then adapts the sampling frequency for frames in the interval [n+1, n+N−1]. Principles of compressive sampling (see, for example, E. J. Candes, "Compressive Sampling," Proceedings of the International Congress of Mathematicians, Madrid, Spain, 2006) may be used to optimally vary the sampling frequencies for the input video signal, yielding substantial computational and memory complexity gains. Additionally, a first quick pre-analysis pass may be performed based on spatially sub-sampled versions of the input pictures and this information is processed to optimally adapt the sampling patterns for the full resolution original sampled input pictures.

Figure 9:
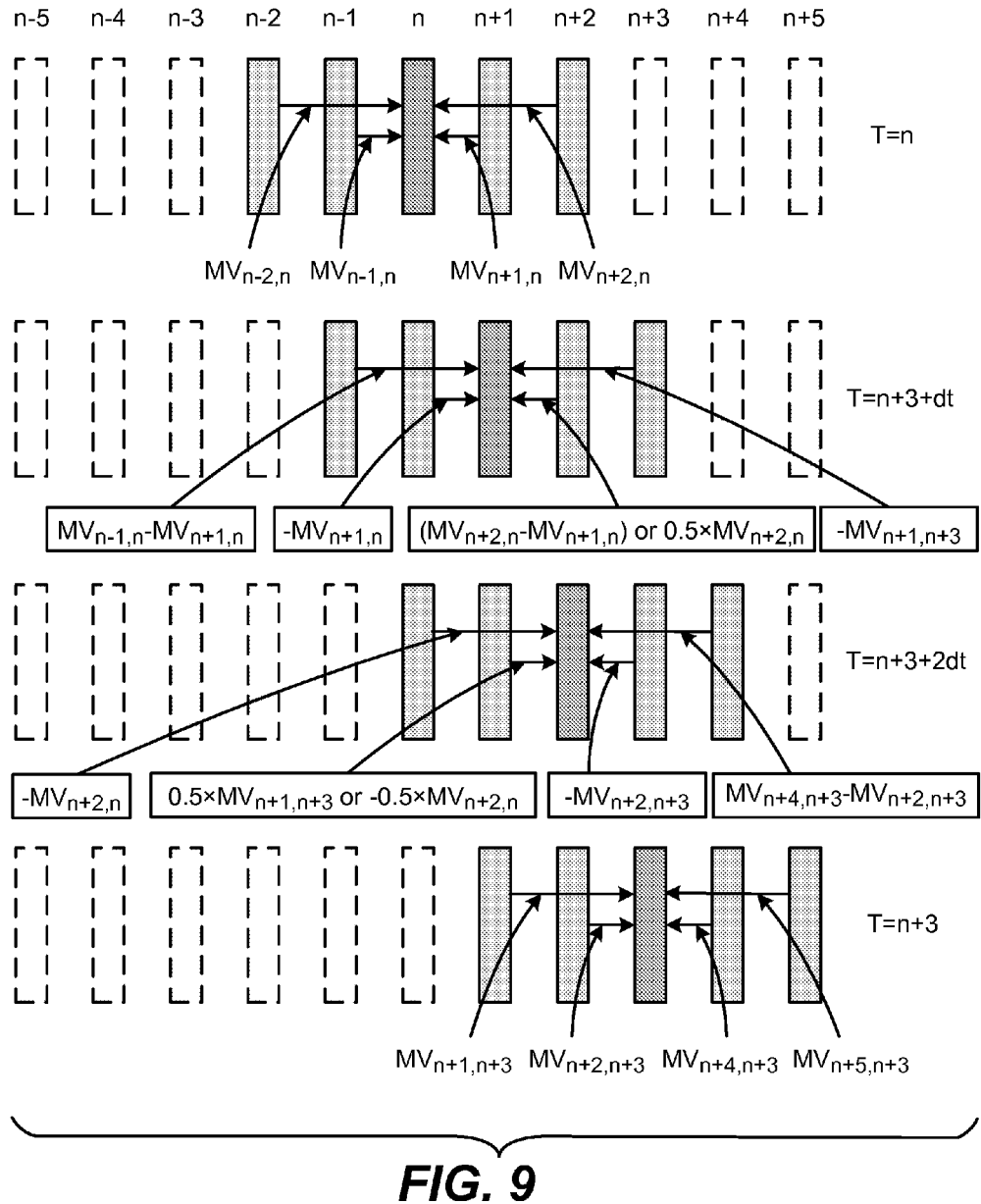
FIG. 9 shows temporal sub-sampling of motion analysis by a factor of 3 (1:3 sub-sampling).

An example of a low complexity motion-compensated temporal analysis module with a down-sampling ratio of 1 over 3 is illustrated in FIG. 9. While the structure in FIG. 8 used past pictures motion parameters to estimate the missing ones, the one in FIG. 9 was designed to take advantage of bi-directional missing motion parameter estimation. This introduces a delay of three pictures, but allows greater reduction of complexity for smaller loss in motion parameter accuracy. FIG. 9 shows that pictures n and n+3 are fully processed, utilizing all the available prediction references from both past and future. No motion estimation and compensation is conducted for pictures n+1 and n+2. However, the missing motion model parameters may be estimated from motion parameters that were used to predict pictures n and n+3.

For picture n+1 the missing parameters can be estimated as follows:
  (a) $MV_{n-1,n+1}$ is estimated as $(MV_{n-1,n}-MV_{n+1,n})$ that is available after processing picture n.
  (b) $MV_{n,n+1}$ is estimated as $-MV_{n+1,n}$ that is available after processing picture n.
  (c) $MV_{n+2,n+1}$ is estimated as either $0.5 \times MV_{n+2,n}$ or as $(MV_{n+2,n}-MV_{n+1,n})$ that are available after processing picture n.
  (d) $MV_{n+3,n+1}$ is estimated as $-MV_{n+1,n+3}$ that is available after processing picture n.

For picture n+3 the missing parameters can be estimated as follows:
  (a) $MV_{n,n+2}$ is estimated as $-MV_{n+2,n}$ that is available after processing picture n.
  (b) $MV_{n+1,n+2}$ is estimated as either $0.5 \times MV_{n+1,n+3}$ that is available after processing picture n+3 or as $-0.5 \times MV_{n+2,n}$ that is available after processing picture n.
  (c) $MV_{n+3,n+2}$ is estimated as $-MV_{n+2,n+3}$ that is available after processing picture n+3.
  (d) $MV_{n+4,n+2}$ is estimated as $(MV_{n+4,n+3}-MV_{n+2,n+3})$ that is available after processing picture n+3.

Figure 16:
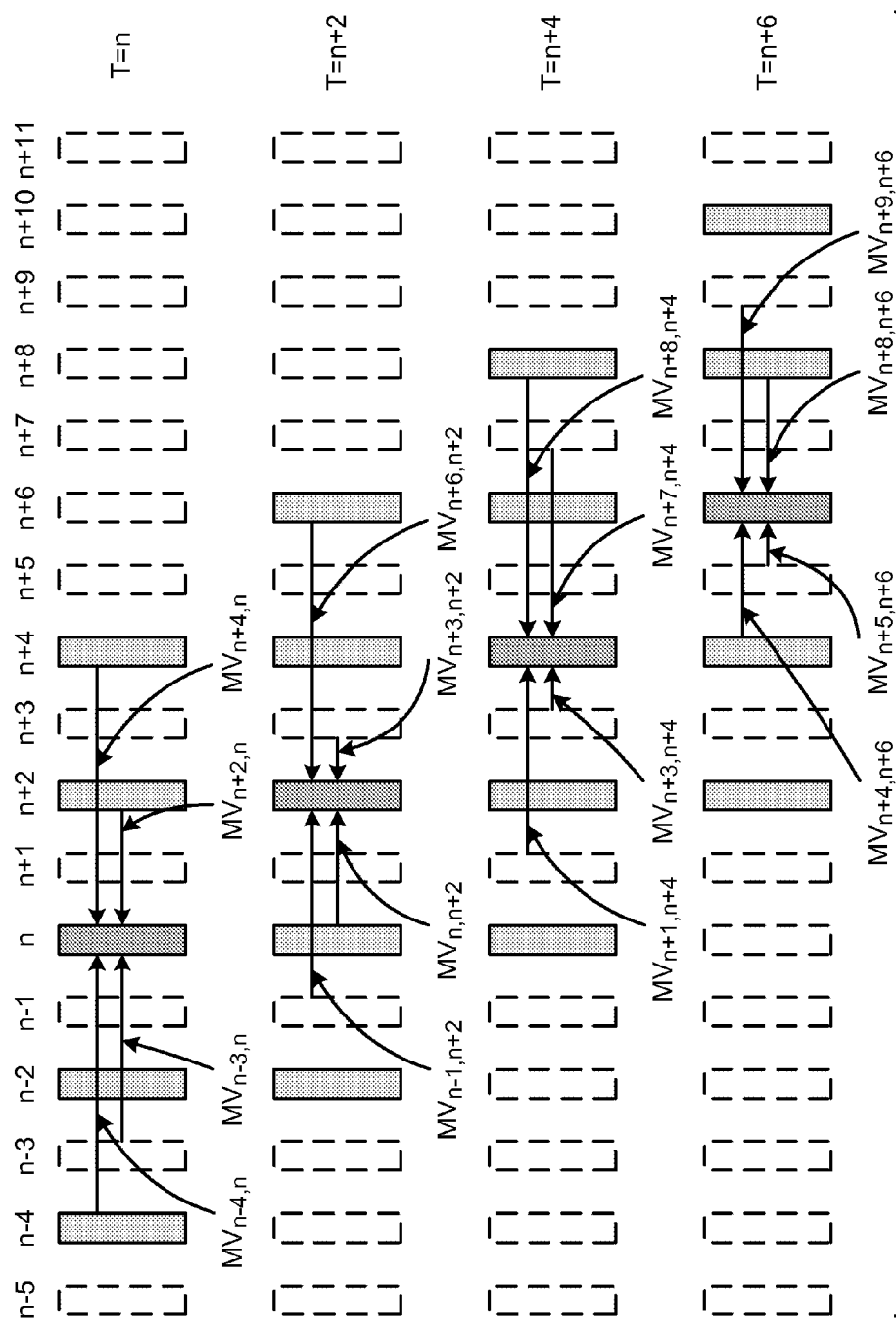
FIG. 16 shows temporal sub-sampling of analyzed pictures where video sequence is analyzed at half the frame rate and any reference pictures may be used.

In a third exemplary embodiment, the algorithms described above in regard to the first and second exemplary embodiments are combined to enable sub-sampling of both the sampled input pictures and the reference picture samples. The sample patterns are either random, or periodic, or arbitrary, or adapt to the underlying statistics of the video sequence for increased performance with respect to the targeted applications. Sub-sampling may be used for the input pictures, but any picture may be used as prediction reference, including the input pictures that were not sampled. FIG. 16 illustrates such sub-sampling, where any picture may be used as a prediction reference. The advantage of this sampling pattern compared to the one illustrated in FIG. 14 is improved temporal analysis. While the structure in FIG. 14 analyzes only even or odd pictures, a sampling structure that is unconstrained in terms of reference pictures, such as the one in FIG. 16, can gather information about all pictures in the sequence. Consider, for example, the case where pictures with indices n+4×k, where k is an integer, are predicted from the closest even-indexed pictures, and pictures with indices n+4×k+2, where k is an integer, are predicted from the closest odd-indexed pictures. Even though half the pictures are sampled and processed, the reference pictures can be set to include pictures that were not sampled and hence calculate vital statistics such as the MAD prediction error. These statistics can facilitate very reliable scene and picture complexity classification at approximately half the computational complexity. The only drawback compared to FIG. 14 is that the memory complexity remains approximately the same.

In a fourth exemplary embodiment, which can be combined with any of the above exemplary embodiments described above, the input picture is in addition sub-sampled (down-sampled) in the spatial domain, and optionally in the bit-depth domain. This approach can help reduce complexity drastically (e.g., by a factor of 4 for a down-sampling factor of 2 in each spatial dimension), and still maintain sufficiently good performance for applications such as: (a) picture and scene complexity classification; (b) bit rate allocation; and (c) video coder prediction structure determination; as indicated above. This may be done for part of or the entire image sequence.

Spatial sub-sampling of the reference pictures may use techniques that do not introduce aliasing, since aliasing could negatively impact the motion estimation process given the "artifacts" and new "frequency" information that it may result in. So it would be best if an antialiasing filter is first applied that tries to avoid as much as possible the introduction of aliasing. Some aliasing could of course still tolerated. It may also be desirable not to filter too much as well so one can still retain the most important characteristics of the signal such as edges (strong filtering can affect such information).

Filtering can also be of a type that converts the signal from one form to another. In particular, especially for hardware applications, one may take an N bit signal and convert it into M bits with M<N. M can even be equal to 1 (i.e. conversion into a binary image). Then motion information can be computed on such edge image information. This method that can be seen as bit-depth sub-sampling can be combined easily with the spatial and temporal subsampling methods. It is recommended usually to apply the temporal first, then spatial (application of an anti-alias filter followed by down-sampling), and then bit-depth reduction.

Motion estimation is obviously applied in this lower resolution (and lower bit-depth if that is used). This reduces the complexity of the search since fewer samples are searched, but of course also reduces the accuracy also. This relates to a hierarchical search, where the search is stopped at a level below the full resolution. Motion estimation even at the spatially sub-sampled and, optionally, bit-depth sub-sampled level may still benefit from hierarchical motion estimation techniques.

Figure 12:
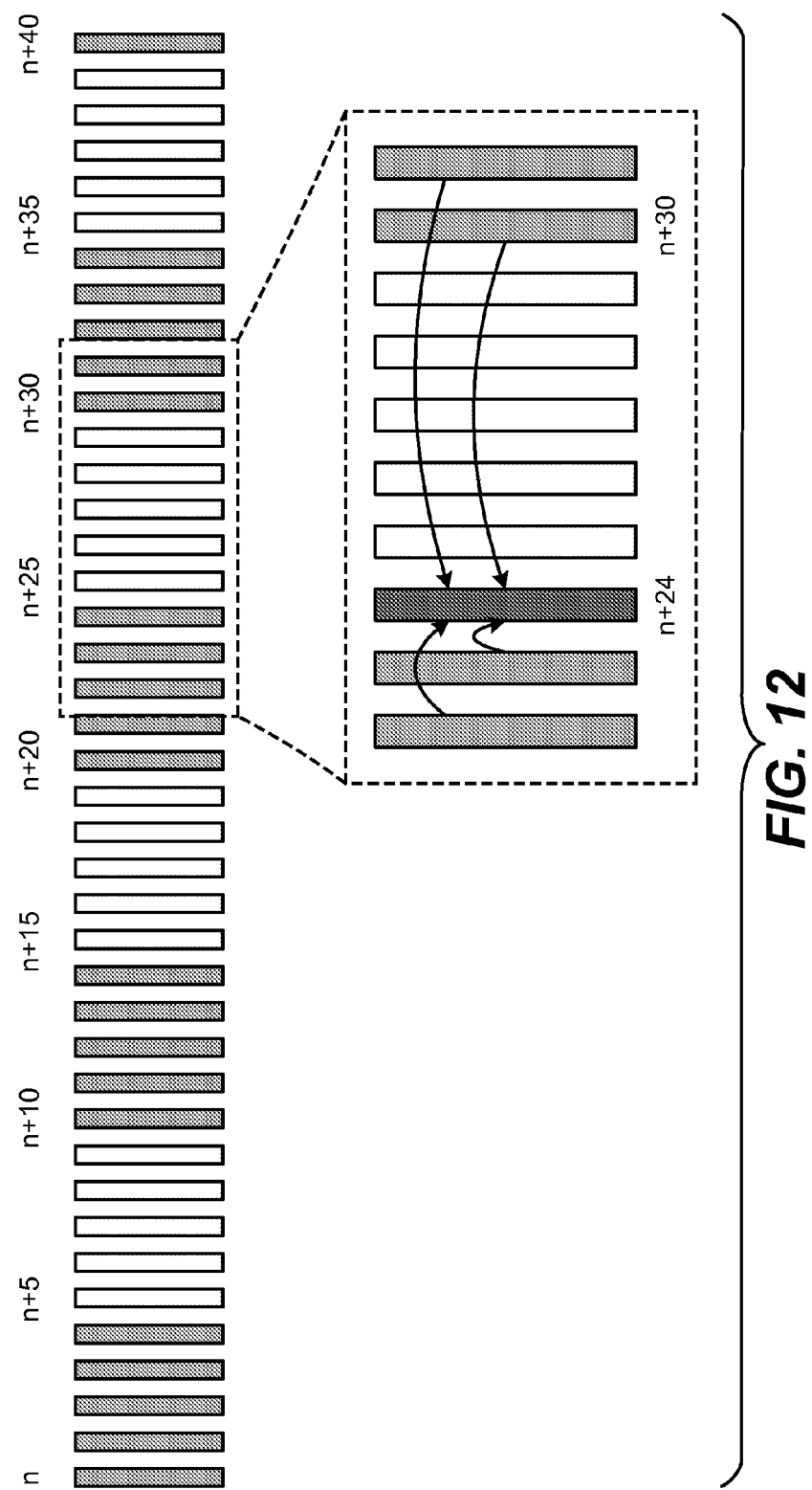
FIG. 12 shows an alternative structure for pre-analysis that is amenable to parallelization.

The sampling pattern of FIG. 12 is amenable to parallelization as different CPUs or GPUs may be allocated to each group of pictures. In general, this sampling pattern involves periods of M consecutive sampled pictures followed by N consecutive pictures that are not processed. Again, reference pictures for motion prediction are drawn only from the pictures that are being sampled. Motion prediction for picture n+24 is illustrated in the inset figure of FIG. 12. Picture n+24 is predicted from pictures n+23 and n+22 (past), and pictures n+30 and n+31 (future). While this sampling pattern is efficient in terms of parallelization and complexity reduction, it may have issues in detecting scene changes or other important scene transitions such as fades, cross-fades, flashes, camera pans, and zooms. Scene characterization is very important for compression efficiency and random access purposes and is one of the most critical functions for a temporal pre-analysis system. Without loss of generality, the handling of scene change detection is described below. Scene change detection can be done with either spatial or temporal processing: if one picture has very different luminance statistics from another, then a scene change could have taken place. Equivalently, if the motion prediction error, when the current picture is predicted from a reference picture, is larger than some threshold, then a scene change could have taken place. However, when N is large, there is a high probability of detecting the scene change long after it has happened. This is also true for other types of scene transitions. In FIG. 12, the scene change might have happened at picture n+25. However, motion prediction takes place with reference picture n+30, which will yield a large prediction error and may be hence misclassified as a scene change.

Figure 15:
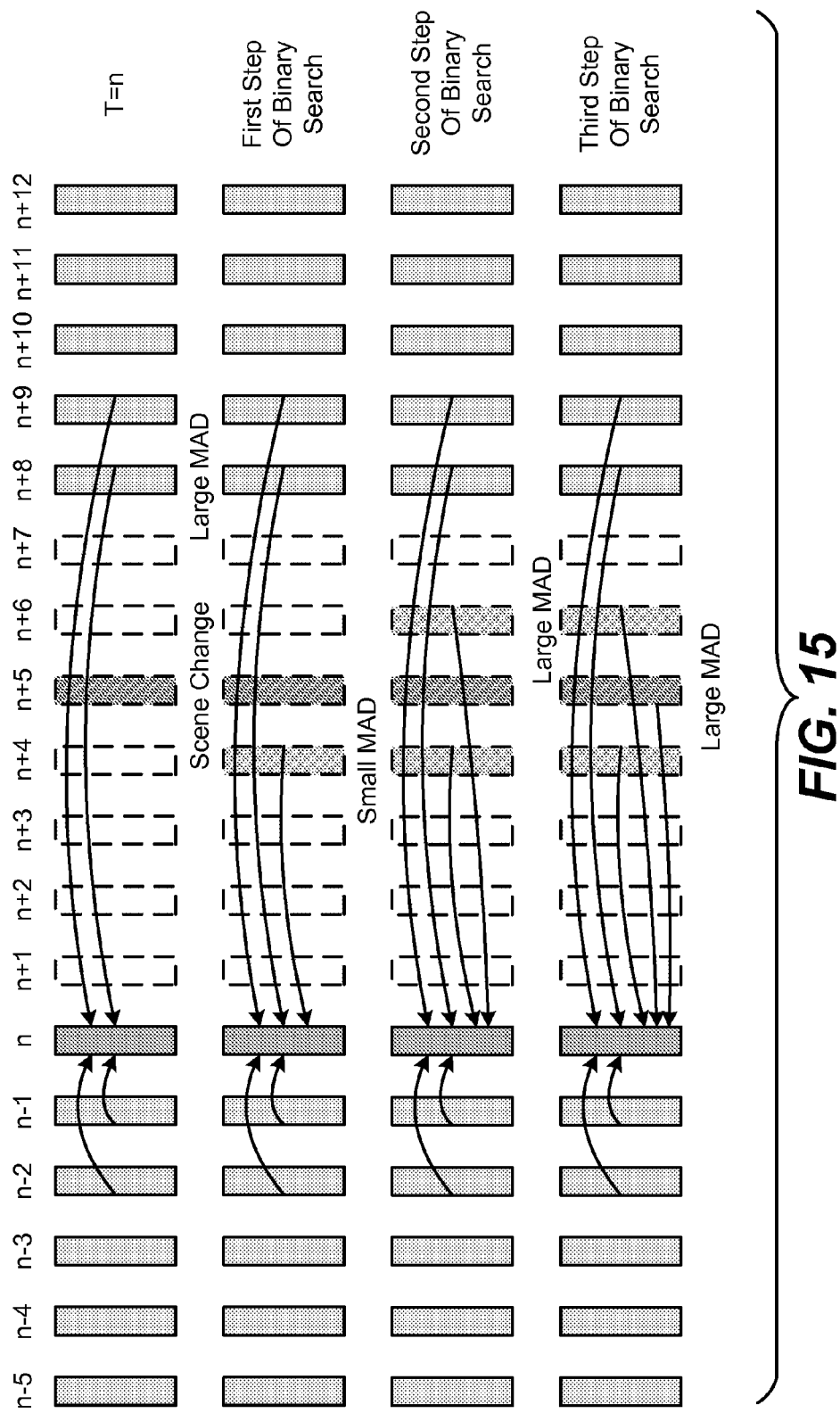
FIG. 15 illustrates binary search for the detection of scene changes.
Figure 17:
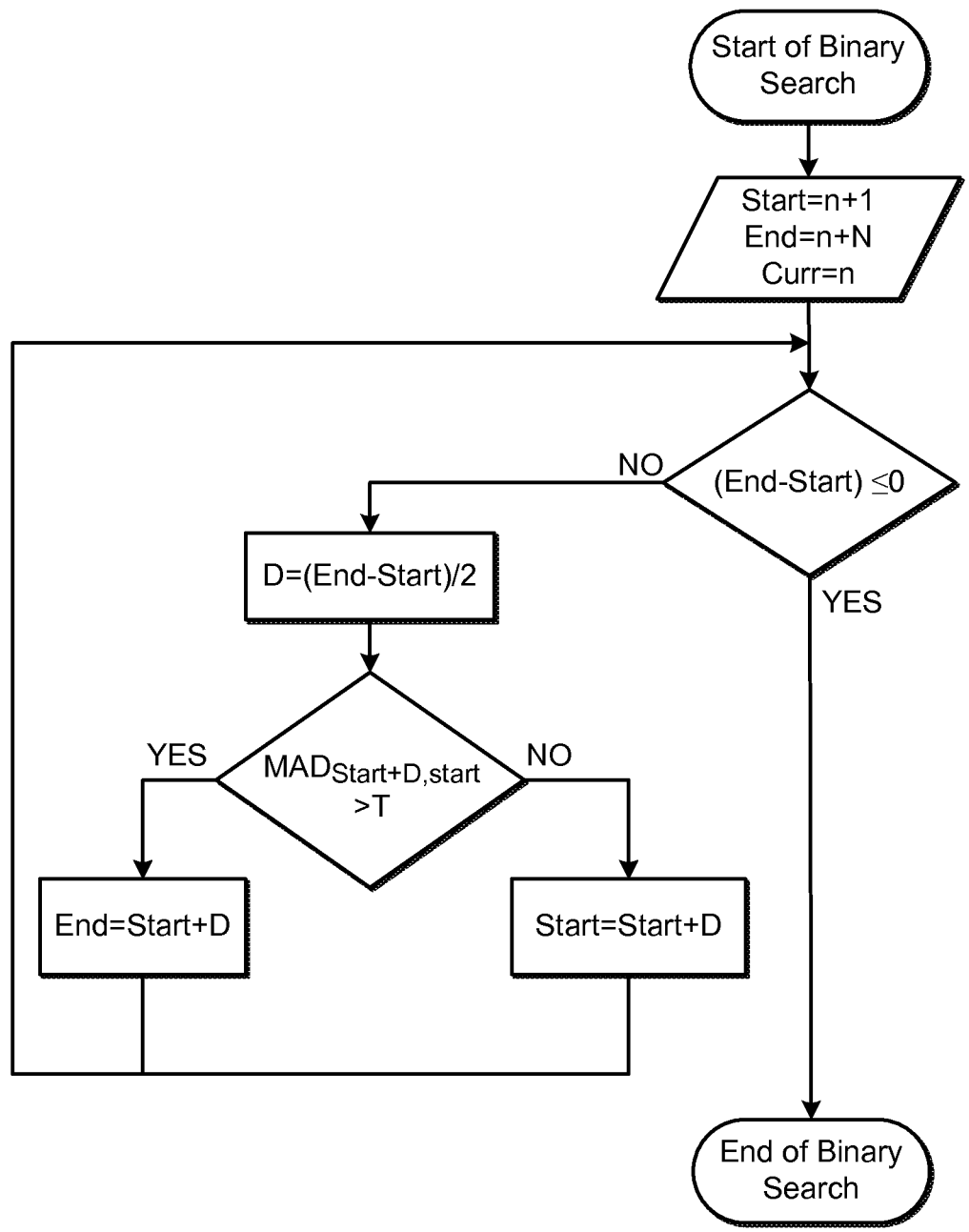
FIG. 17 is a block diagram of a binary search for sub-sampled temporal pre-analysis refinement.
Figure 18:
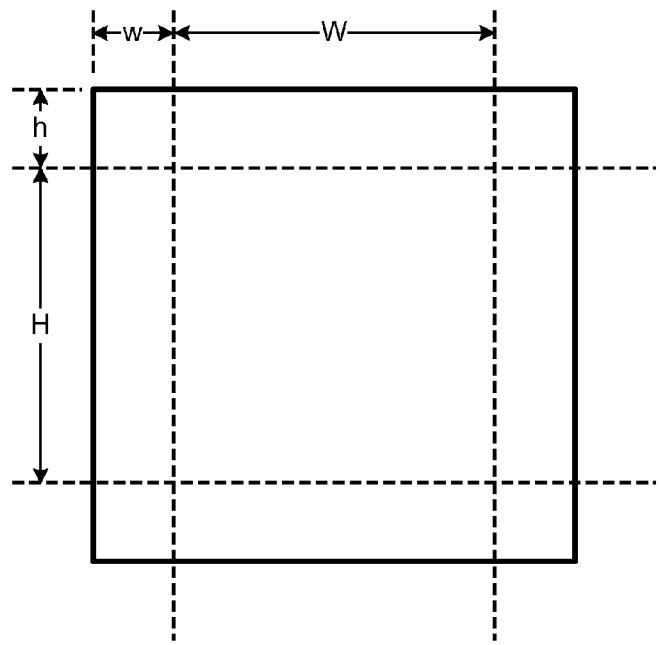
FIG. 18 depicts an example of overlapped block motion compensation and estimation.

A fifth exemplary embodiment, which is depicted in FIG. 15, addresses the above problem (that is, any pattern of sampling that includes subsampling that may miss a scene transition) with the use of a fast search algorithm, in this case, a binary search. The method is now described in additional detail. Let N be the number of pictures that are not sampled or used as reference pictures between two sampled pictures, n and n+N+1. If the prediction error (e.g., MAD) between picture n and its motion compensated prediction from picture n+N+1 is surpassing a threshold, then more analysis has to be performed to detect potential scene transitions such as scene changes. The same is also valid if the prediction error (e.g. MAD) between picture n+N+1 and its motion compensated prediction from picture n is surpassing a threshold. In that case, the processed picture n or n+N+1 is predicted from picture n+N/2. If the prediction error still surpasses the threshold, then it is predicted from picture n+N/4. Otherwise, it is predicted from picture n+3×N/4. This iteration is repeated until the search space has been reduced to one picture and can no longer be bisected. The number of iterations is approximately $\log_2(N)$. Let $MAD_{u,v}$ denote the prediction error when picture u is used to predict picture v. An informational diagram of binary search for scene change detection and complexity classification is provided in FIG. 17.

This process, as shown in the example depicted in FIG. 15, is as follows:
(a) Picture n is predicted using motion-compensation from picture n+8, and the prediction error is found to be greater than a threshold $T_0$.
(b) Picture n is then predicted from picture n+1+((n+7)−(n+1))/2=n+4, and the prediction error is found to be smaller than a threshold $T_1$.
(c) Picture n is then predicted from picture n+4+((n+7)−(n+4))/2=n+6, and the prediction error is found to be greater than a threshold $T_2$.
(d) Picture n is then predicted from picture n+4+((n+6)−(n+4))/2=n+5, and the prediction error is found to be greater than a threshold $T_3$.

Picture n+5 has been detected as the scene change after three iterations of the binary search algorithm.

Figure 19:
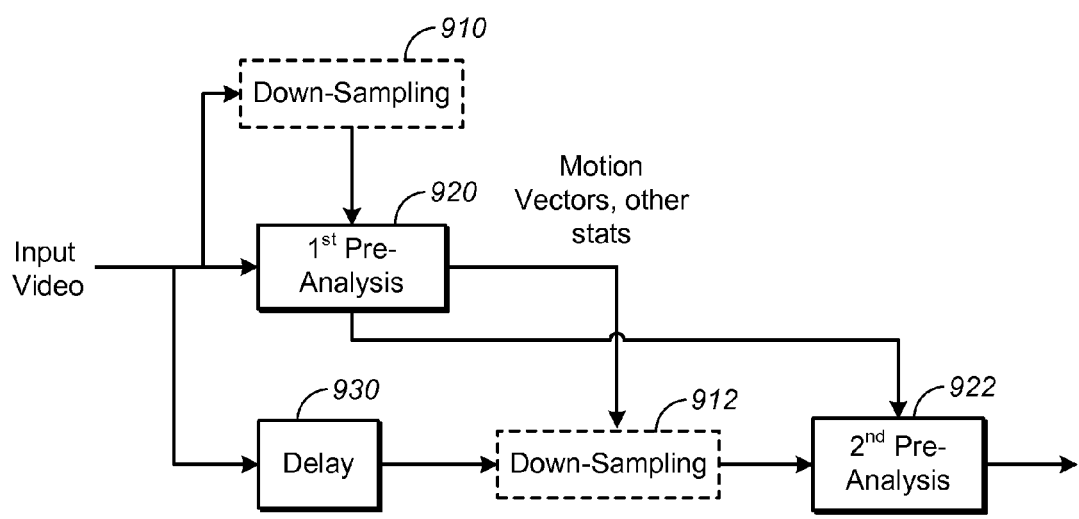
FIG. 19 shows a block diagram for a hierarchical pre-analysis.

As briefly discussed above, a sixth exemplary embodiment, incorporates aspects of the previous embodiments to create a hierarchical pre-analysis system where a first analysis at a certain spatio-temporal resolution is performed, and then, given the results of that analysis, the spatial resolution or temporal resolution or both resolutions may be increased to further refine the analysis. A block diagram for a hierarchical pre-analysis system is shown in FIG. 19. A first pre-analysis pass 920 determines parameters to perform a second pre-analysis pass 922. The first pass 920 is designed to have lower complexity than the final pass and estimate the settings for the second pass 922 (what kind of sub-sampling, how many references, etc.) such the pre-analysis performance (quality of motion vectors, classification, characterization, etc.) is maximized. In one example, the first pass 920, even though it operates at a lower resolution (temporal and spatial), determines high motion for certain segments. It then instructs the second or subsequent pass 922 to use a higher temporal resolution. For both analysis passes, downsampling 910, 912 may be used prior to analysis or the analysis may be performed on a sub-sampled version of the input video.

The sixth embodiment may also incorporate additional or subsequent pre-analysis passes. These passes may be required if, for example, a first or earlier pre-analysis module determines that the statistics that it derived were not reliable enough. Reliability can be estimated as a function of some statistical analysis of the pre-analysis results, some sanity checks, or comparison with past pre-analysis statistics. Then, an additional pass with increased temporal or spatial or spatiotemporal resolution may be performed. This may not involve the entire input sequence but just the subset for which the results are deemed unreliable.

The methods and systems described above are applicable to motion-compensated temporal analysis that uses arbitrary types of motion models, as well as arbitrary number of reference pictures for motion-compensated prediction. The prediction error may be either the Mean Absolute Difference, or the Mean Squared Error, or some other metric that represents distortion due to misprediction. The motion-compensated reference pictures may vary from one picture to the other and can have arbitrary positions and temporal distances from the current picture. They need not be consecutive. Note also that the methods and systems described above are applicable in cases of fractional pixel motion compensation as well as for higher order motion models, such as the affine motion model.

The descriptions of the embodiments above generally described operations on a single view video image, i.e., typical two-dimensional video images. However, these operations may be applied to multiple view video images such as, for example three-dimensional stereoscopic video images. In some multi-view applications, the embodiments may operate on the views independently where the motion estimates are derived from sets of frames associated with one of the views. In other multi-view applications, the embodiments may operate on data derived from multiple sets of views, where motion estimates from one view may be used for motion estimates of another view. In still other multi-view applications, the embodiments may use analysis data to determine whether motion estimates should be based solely on a single view or multiple-views. In particular, where the input video comprises three-dimensional stereoscopic frame compatible signals, the analysis described above may be done mainly in one view, but, for some frames, could also be performed on both views.

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art.

No limitation is intended by the description of exemplary embodiments which may have included tolerances, feature dimensions, specific operating conditions, engineering specifications, or the like, and which may vary between implementations or with changes to the state of the art, and no limitation should be implied therefrom. In particular it is to be understood that the disclosures are not limited to particular compositions or biological systems, which can, of course, vary. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. It is also to be understood that the terminology used herein is for the purpose of describing particular embodiments only, and is not intended to be limiting. Reference to a claim element in the singular is not intended to mean "one and only one" unless explicitly so stated. As used in this specification and the appended claims, the singular forms "a," "an," and "the" include plural referents unless the content clearly dictates otherwise. The term "several" includes two or more referents unless the content clearly dictates otherwise. Unless defined otherwise, all technical and scientific terms used herein have the same meaning as commonly understood by one of ordinary skill in the art to which the disclosure pertains.

Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising step(s) for . . . "

The methods and systems described in the present disclosure may be implemented in hardware, software, firmware, or combination thereof. Features described as blocks, modules, or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A method, implemented by a video coder including a processor, for motion analysis of a video signal, the method comprising steps of:

receiving, by the video coder, the video signal, wherein the video signal comprises at a selected time at least one of the following input pictures: a current picture, one or more past pictures, and one or more future pictures;
temporal down sampling, by the video coder, the video signal to generate one or more sampled input pictures at a temporal resolution;
spatial down sampling, by the video coder, the input pictures at a selected spatial resolution,
selecting, by the video coder, a number of reference pictures to generate one or more reference pictures for a sampled input picture,
calculating, by the processor, motion parameters based on a number of the reference pictures or a combination of the one or more reference pictures and a selection of input pictures;
determining, by the processor, if the calculated motion parameters have a desired motion accuracy;
if the calculated motion parameters do not have the desired motion accuracy based on a prediction error threshold, repeating the temporal down sampling, the spatial down sampling, and the selecting steps by using a binary search algorithm to reselect the one or more reference pictures, reselecting the one or more reference pictures, calculating motion parameters, and determining if the calculated motion parameters have the desired motion accuracy, wherein the steps are repeated until a desired motion accuracy is reached;
designating, by the processor, the calculated motion parameters with the desired motion accuracy as the final calculated motion parameters;
predicting, by the processor, one or more selected sampled input pictures based on the final calculated motion parameters,
wherein motion analysis comprises the predictions of the one or more selected sampled input pictures; and
outputting, from the video coder, an output video signal of output pictures based on the predicting.

2. The method according to claim 1, wherein the video signal comprises a single view video image.

3. The method according to claim 1, wherein the video signal comprises a multiple view video image.

4. The method according to claim 1, wherein the temporal down sampling the video signal comprises sampling each picture in the video signal and the number of reference pictures varies for each one of the one or more selected sampled input pictures.

5. The method according to claim 1, wherein the one or more reference pictures correspond to a sampled input picture and the number of reference pictures varies for each one of the one or more selected sampled input picture.

6. The method according to claim 4 or claim 5, wherein the calculating motion parameters comprises constraining motion parameters for selected pictures in the video signal.

7. The method according to claim 1, wherein the temporal down sampling the video signal comprises selectively sampling less than each picture in the video signal, whereby each one of the one or more selected sampled input pictures corresponds to one or more pictures in the video signal.

8. The method according to claim 7, wherein the selecting comprises selecting pictures in the video signal for sampling in at least one of the following patterns: a periodic pattern; a non-periodic pattern; or a combination of periodic and non-periodic patterns.

9. The method according to claim 1, wherein the temporal down sampling the video signal comprises sampling each picture in the video signal or selectively sampling less than each picture in the video signal and wherein at least one predicted sampled input picture corresponds to more than one current picture and wherein predicting selected sampled input pictures comprises predicting at least one selected sampled input picture based on calculated motion parameters for a previous selected sampled input picture.

10. The method according to claim 9, wherein the temporal down sampling the video signal comprises sampling each picture in the video signal and the number of reference pictures varies for each selected sampled input picture.

11. The method according to claim 9, wherein the one or more reference pictures correspond to fewer than each picture in the video signal and the number of reference pictures varies for each selected sampled input picture.

12. The method according to claim 9, wherein the selecting comprises selecting pictures in the video signal for sampling in at least one of the following patterns: a periodic pattern; a non-periodic pattern; or a combination of periodic and non-periodic patterns.

13. The method according to claim 1, wherein the spatial down sampling comprises spatially sub-sampling one or more past pictures or one or more future pictures or one or more past pictures and one or more future pictures to produce one or more spatially sub-sampled reference pictures and calculating motion parameters comprises calculating motion parameters for each one of the one or more spatially sub-sampled reference pictures.

14. The method according to claim 13, wherein the spatial down sampling further comprises filtering prior to spatially sub-sampling.

15. The method according to claim 14, wherein the filtering comprising antialiasing filtering or bit-depth sub-sampling or some combination thereof.

16. The method according to claim 9, further comprising iteratively comparing selected predicted sampled input pictures to a corresponding current picture and determining a scene transition occurrence in the video signal based on the iterative comparison.

17. The method according to claim 16, wherein the temporal and/or spatial resolution used for temporal down sampling and spatial down sampling is selected to increase the ability to determine a scene transition occurrence.

18. A system for motion analysis of a video signal, wherein the video signal comprises a stream of input video frames and the system comprises:
a spatial-downsampling module, wherein the spatial-downsampling module is configured to reduce the spatial resolution of one or more sampled input pictures; and
a pre-analysis module, wherein the pre-analysis module is configured to
i) sample the video signal to generate the one or more sampled input pictures at a temporal resolution,
ii) calculate motion parameters based on the one or more sampled input pictures and a number of reference pictures selected from input video frames,
iii) check the motion parameters, if the motion parameters do not achieve a desired motion accuracy,
iiia) resample the video signal at an increased temporal resolution utilizing a binary search to generate one or more sampled input pictures at a higher temporal resolution,
iiib) reselect the number of reference pictures for the one or more sampled input pictures, and
iiic) calculate the motion parameters from the one or more higher resolution sampled input pictures and the number of reference pictures, and wherein the pre-analysis module is further configured to repeat the calculations at an increased resolution until the desired motion accuracy is reached based on a prediction error failing to surpass a prediction error threshold.

19. The system according to claim 18, wherein the system comprises a pre-filter module, wherein the pre-filter module is configured to receive the motion parameters and the processed video frames and generate filtered video frames.

20. The system according to claim 19, wherein the system comprises a video encoder module, wherein the video encoder is configured to receive the filtered video frames and the motion parameters and generate motion-compensated video frames.

21. The system according to claim 18, wherein the video signal comprises a single view video image.

22. The system according to claim 18, wherein the video signal comprises a multiple view video image.

23. The system according to claim 18, wherein each input video frame is sampled and the number of reference pictures varies for each sampled video frame.

24. The system according to claim 18, wherein the video signal is selectively sampled, whereby less than each input video frame is sampled.

25. The method according to claim 1, wherein the prediction error threshold changes for each step of the binary search.

* * * * *